US012784093B2

(12) United States Patent
Lai et al.

(10) Patent No.: US 12,784,093 B2
(45) Date of Patent: Nov. 3, 2026

(54) METHOD FOR GENERATING TRAINING INPUT-OUTPUT PAIRS FROM SEQUENCES OF USER ACTIVITIES

(71) Applicant: Go Daddy Operating Company, LLC, Scottsdale, AZ (US)

(72) Inventors: Wei-Cheng Lai, Cupertino, CA (US); Yu Tian, Sunnyvale, CA (US); Wenbo Wang, Sunnyvale, CA (US); Chungwei Yen, Santa Clara, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 75 days.

(21) Appl. No.: 18/495,570

(22) Filed: Oct. 26, 2023

(65) Prior Publication Data

US 2025/0139410 A1 May 1, 2025

Related U.S. Application Data

(63) Continuation of application No. 16/259,796, filed on Jan. 28, 2019, now abandoned.

(51) Int. Cl.
*G06Q 30/0601* (2023.01)
*G06F 16/334* (2025.01)
(Continued)

(52) U.S. Cl.
CPC ..... *G06Q 30/0633* (2013.01); *G06F 16/3344* (2019.01); *G06F 18/2148* (2023.01);
(Continued)

(58) Field of Classification Search
CPC ...... G06N 3/0455; G06N 3/084; G06N 20/00; G06N 3/02; G06Q 30/0633; G06F 16/3344; G06F 18/2148; H04L 61/3025
See application file for complete search history.

(56) References Cited

U.S. PATENT DOCUMENTS 8,984,098 B1 * 3/2015 Tomkins ............... G06F 16/487
709/219
10,812,449 B1 * 10/2020 Cholleton .............. G06N 3/044
(Continued)

FOREIGN PATENT DOCUMENTS

CN 108550046 A * 9/2018 ............. G06Q 30/02
WO WO-2015083115 A2 * 6/2015 ......... G06F 16/9535
WO WO-2018150244 A1 * 8/2018 ............. G06F 16/22

OTHER PUBLICATIONS

Liew et al., "Use of subword tokenization for domain generation algorithm classification", Sep. 7, 2023, Cybersecurity, vol. 6 (2023), pp. 1-12 (Year: 2023).*
(Continued)

*Primary Examiner* — Usmaan Saeed
(74) *Attorney, Agent, or Firm* — CHIP LAW GROUP

(57) ABSTRACT

Methods are taught for creating training data for a learning algorithm, training the learning algorithm with the training data and using the trained learning algorithm to suggest domain names to users. A domain name registrar may store activities of a user on a registrar website. Preferably, domain name searches, selected suggested domain names and domain names registered to the user are stored as the training data in a training database. The training data may be stored so that earlier activities act as inputs to the learning algorithm while later activities are the expected outputs of the learning algorithm. Once trained, the learning algorithm may receive activities of other users and suggest domain names to the other users based on their activities.

17 Claims, 19 Drawing Sheets

(51) Int. Cl.

| | |
|---|---|
| ***G06F 18/214*** | (2023.01) |
| ***G06N 3/02*** | (2006.01) |
| ***G06N 3/0455*** | (2023.01) |
| ***G06N 3/084*** | (2023.01) |
| ***G06N 20/00*** | (2019.01) |
| ***H04L 61/3015*** | (2022.01) |

(52) U.S. Cl.
CPC ............. *G06N 3/02* (2013.01); *G06N 3/0455* (2023.01); *G06N 3/084* (2013.01); *G06N 20/00* (2019.01); *H04L 61/3025* (2013.01)

(56) References Cited

U.S. PATENT DOCUMENTS

| | | | | |
|---|---|---|---|---|
| 11,080,483 | B1* | 8/2021 | Islam | G06F 16/35 |
| 2016/0092699 | A1* | 3/2016 | Riva | H04L 63/0421<br>726/26 |
| 2016/0364757 | A1* | 12/2016 | Zhang | G06Q 30/0269 |
| 2017/0178218 | A1* | 6/2017 | Feris | G06Q 30/0633 |
| 2017/0351953 | A1* | 12/2017 | Raemy | G06N 20/00 |
| 2019/0068550 | A1* | 2/2019 | Sheth | G06Q 30/0631 |
| 2019/0104331 | A1* | 4/2019 | Bapna | G06Q 10/40 |
| 2019/0141021 | A1* | 5/2019 | Isaacson | G06Q 10/40 |
| 2019/0370393 | A1* | 12/2019 | Finch | G06F 16/3338 |
| 2020/0242406 | A1* | 7/2020 | Lai | G06N 3/048 |
| 2020/0351241 | A1* | 11/2020 | Bajaj | G06F 16/9535 |
| 2023/0334104 | A1* | 10/2023 | Qian | G06F 16/954 |

OTHER PUBLICATIONS

Gong et al., "Character-level domain name generation algorithm based on ED-GAN", 2022, ICSCA '22: Proceedings of the 2022 11th International Conference on Software and Computer Applications, vol. 11 (2022), pp. 198-205 (Year: 2022).*

Shu et al., "GWDGA: An Effective Adversarial DGA", 2022, Frontiers in Cyber Security, vol. 2021, pp. 30-48 (Year: 2021).*

Namecheap, 2006, https://web.archive.org/web/20061225062321/https://www.namecheap.com/, retrieved on Mar. 6, 2023 (Year: 2006).*

* cited by examiner

Training Database 180

| Input Domain Search 300 | Expected Domain Name Suggestion 310 | OPTIONAL Related Searches 320 | OPTIONAL Related Registered Domain Name(s) 330 |
|---|---|---|---|
| mybike.com | bestbike.com | best-bike.com<br>topbike.com | hotbikes.com<br>great-bikes.com |
| new-york-pizza.com | pizza.ny | Italian-food.ny | best-ny-pizza.us |
| smith-family.com | smithfamily.com | | smith-vacation.us |
| dogbreeders.us | canine.com | | |

Training Data 340

FIG. 3

Possible extension 2 : portfolio-driven (take seq2seq as an example, can be applied to GAN too)

150

160

Neural Network (NN)

SIGMOID NEURON

Creating Training Data for a Learning Algorithm to Suggest a Domain Name

Training a Learning Algorithm to Suggest a Domain Name

Using a Learning Algorithm to Suggest a Domain Name

METHOD FOR GENERATING TRAINING INPUT-OUTPUT PAIRS FROM SEQUENCES OF USER ACTIVITIES

FIELD OF THE INVENTION

The present invention generally relates to the field of creating training data, using domain name searches, selected suggested domain names and/or registered domain names, to train a learning algorithm to suggest domain names to users.

SUMMARY OF THE INVENTION

The present invention provides methods for 1) creating training data for a learning algorithm to suggest a domain name to a user using training data gathered from the activities of a plurality of users searching for domain names; 2) training the learning algorithm on the created training data to suggest a domain name; and 3) suggesting a domain name to a user using the learning algorithm trained on the training data.

Creating Training Data

A domain name registrar may collect training data from activities of a plurality of different users (who may be new visitors and/or returning customers). The users, particularly if they are returning customers, may have a registrar customer account with the domain name registrar. The domain name registrar may log the activities of the users that visit a registrar website operated by the domain name registrar. The domain name registrar may store specific activities of the users/customers in a training database. In general, earlier activities of the user are stored in the training database as inputs to a learning algorithm, while later activities are stored in the training database as expected outputs of the learning algorithm. This trains the learning algorithm to predict a desired future action (possibly suggesting a desired domain name) based on a given a current action (a user entered current domain name search).

As a specific example, a user may visit a registrar website and enter a first domain name search into a field on a webpage of the registrar website. The domain name registrar may, using any desired technique, spin the first domain name search into a first plurality of suggested domain names. The user might or might not select one or more of the suggested domain names for entry into an electronic shopping cart. The user might or might not purchase and register one or more of the selected suggested domain names in the electronic shopping cart. These activities may be monitored and stored for future analysis.

The user may repeat this process one or more times over the course of a single continuous login session. In other words, the user may repeat the process of entering additional domain name searches, receiving additional suggested domain names, selecting (or not selecting) one or more of the suggested domain names and registering (or not registering) one or more of the selected suggested domain names.

In a preferred embodiment, the domain name searches, selected suggested domain names and/or registered domain names are all evaluated to verify they are related to a common search to prevent mixing data, for example, from the user's professional or commercial activities with the user's personal or family activities. This may be performed, as an example, by tokenizing the domain name search(es), selected suggested domain name(s) and/or registered domain name(s) and only counted as related (and thus combined together and stored in the training base) if they share at least one token or a synonym of the one token. This filters out unrelated data and prevents the training data from combining an input related to a first topic with an expected output from a different second topic.

Data entered by the user representing domain name search(es), selected suggested domain name(s) and/or registered domain name(s) entered in a single continuous login session of the user are preferably stored in the training database in predefined allowable formats. As a non-limiting example of an allowable format, a first domain name search may be an input domain search and a second domain name search may be an expected domain name suggestion. Please note that the first domain name search was entered before the second domain name search.

As another non-limiting example of an allowable format, the second domain name search may be an input domain name search and a third domain name search may be an expected domain name suggestion. Again, the input domain name search, i.e., the second domain name search, was entered before the expected domain name suggestion, i.e., the third domain name search.

As another non-limiting example of an allowable format, the first domain name search may be an input domain search and a selected suggested domain name may be an expected domain name suggestion. As before, the first domain name search was entered before a suggested domain name was selected by the user. When the user activities are occurring, the domain name registrar may tag every activity with a time stamp to help insure the training data is kept in the general format of earlier activities being the input to the learning algorithm, while later activities are the expected output of the learning algorithm.

As another non-limiting example, the first domain name search may be an input domain search and a registered domain name may be an expected domain name suggestion. These formats are desirable as the input domain search (entered earlier in time by the user) leads to the expected domain name suggestion (produced later in time). Thus, the learning algorithm will take as input the input domain search and be trained to produce the expected domain name suggestion. The training data is preferably stored in the training database in one or more of these allowable formats.

Data entered by the user representing domain name search(es), selected suggested domain name(s) and/or registered domain name(s) should not be stored in the training database or used to train the learning algorithm in predefined unallowable formats. As a non-limiting example of an unallowable format, a second domain name search should not be stored as an input domain search with a first domain name search being stored as an expected domain name suggestion.

As another non-limiting example of an unallowable format, a third domain name search should not be stored as an input domain name search with the second domain name search being stored as an expected domain name suggestion. Again, this would incorrectly store a later activity as an input with an earlier activity as an expected output.

As another non-limiting example of an unallowable format, a selected suggested domain name should not be stored as an input domain search with a domain name search stored as an expected domain name suggestion.

As another non-limiting example of an unallowable format, a registered domain name should not be stored as an input domain search with a domain name search being stored as an expected domain name suggestion.

These formats are not desirable as the input domain search (produced later in time by the user) leads to the expected domain name suggestion (entered earlier in time). This is in reverse order from the desired direction of the learning algorithm.

The above process of collecting data may be repeated for a plurality of other users and/or the same user during a different continuous login session.

Training a Learning Algorithm

Learning algorithms are trained using training data. A domain name registrar may read the training data from the training database. The training data preferably comprises an input and an expected output. The input to the learning algorithm may be an input domain name search (preferably tokenized to words) and optionally other domain name search(es), selected suggested domain name(s) and/or registered domain name(s) of the user. If a piece of user activity data is missing, a default value may be used. The expected output may be an expected domain name suggestion.

The training involves applying the input to an encoder of the learning algorithm. The encoder creates a high dimension meaning vector which is applied to a decoder of the learning algorithm. An output of the decoder of the learning algorithm is compared with the expected output as stored in the training data. Using any desired technique, such as, as non-limiting examples, gradient descent and/or back propagation, the parameters of the encoder of the learning algorithm are adjusted so that the input is more likely to produce the expected output in future runs.

The training process of the learning algorithm may be repeated using all (or some given portion) of the training data. A full-cycle of using all (or some desired portion) of the training data may be referred to as an epoch. Additional epochs, i.e., full-cycles of using all (or some given portion) of the training data, may be performed until the learning algorithm has been trained to a desired level. If parts of the training data are not used for training, these unused parts of the training data may be used to check the progress of the training of the learning algorithm to determine if the learning algorithm has been trained to a desired level.

Using a Learning Algorithm to Produce a Suggested Domain Name

A domain name registrar may collect activity data regarding the activities of a user on the registrar website, such as one or more domain name searches entered by the user, one or more suggested domain names selected and entered into an electronic database and/or one or more registered domain names in a registrar customer account of the user.

The registrar may apply the most recent domain name search, preferably tokenized to words, to an encoder of the learning algorithm (now trained using the created training database). In other embodiments, one or more other domain name searches, one or more selected suggested domain names in the electronic database and/or one or more domain names registered to the user are also applied to the learning algorithm as inputs to the encoder of the learning algorithm. If a piece of user activity data is missing, a default value may be used. It should be appreciated that the types of input data used to train the learning algorithm should match and be the same as when actually using the learning algorithm to produce a suggested domain name.

The encoder may create a high dimensional meaning vector from the input and apply the high dimensional meaning vector to a decoder of the learning algorithm. The decoder may convert the high dimensional meaning vector to one or more character strings which may be used to create a suggested domain name. The suggested domain name may be transmitted to the user and, if selected by the user for registration, registering the domain name to the user. In other embodiments, the suggested domain name may be spun into additional suggested domain names which may also be transmitted to the user for selection and possible registration.

The above features and advantages of the present invention will be better understood from the following detailed description taken in conjunction with the accompanying drawings.

BRIEF DESCRIPTION OF THE DRAWINGS

FIG. 3 is an illustration of example training data that may be stored in a training database. The training data comprises a pair, which comprises an input domain search and an expected domain name suggestion. The training data may also store one or more searches, related to the associated pair, and/or one or more domain names, also related to the associated pair.

DETAILED DESCRIPTION

Figure 1:
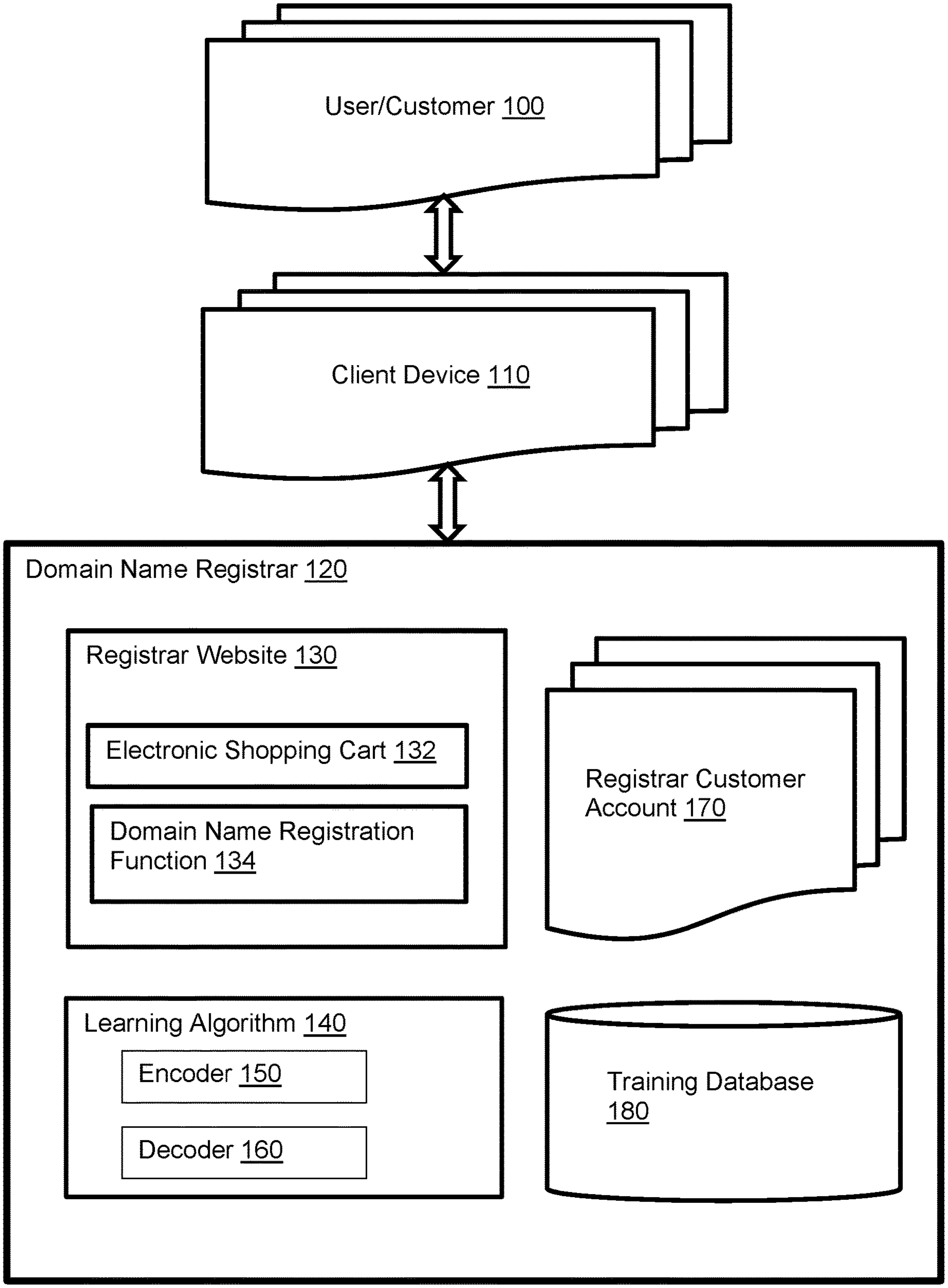
FIG. 1 is a block diagram illustrating that a user/customer may use a client device connected, preferably through the Internet, to a domain name registrar. The domain name registrar comprises a registrar website, a learning algorithm, registrar customer accounts and a training database.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A computer network is a collection of links and nodes (e.g., multiple computers and/or other client devices connected together) arranged so that information may be passed from one part of the computer network to another over multiple links and through various nodes. Examples of computer networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users on client devices. Hundreds of millions of people around the world have access to client devices connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Internet are multimedia websites, some of which may offer and sell goods and services to individuals and organizations. Websites may consist of a single webpage, but typically consist of multiple interconnected and related webpages. Websites, unless very large and complex or have unusual traffic demands, typically reside on a single server and are prepared and maintained by a single individual or entity (although websites residing on multiple servers is certainly possible). Menus, links, tabs, etc. may be used to move between different web pages within the website or to move to a different website.

Websites may be created using HyperText Markup Language (HTML) to generate a standard set of tags that define how the webpages for the website are to be displayed. Websites may comprise titles, tags and text. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user on the client device. The user may then view other webpages at the same website or move to an entirely different website using the browser.

Some Internet users, typically those that are larger and more sophisticated, may provide their own hardware, software, and connections to the Internet. Many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6), is a 128-bit binary number. The standard human readable notation for IPV6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server files are stored within the registry, and a registrar is the authoritative source for the contact information related to the domain name. Such registries are referred to as "thin" registries. Most domain names having a gTLDs are organized through a Shared Registration System (SRS) based on their TLD.

Referring to FIG. 1, a user 100 is hereby defined to be a person or entity that is in the process of registering a domain name or has already registered a domain name. A user 100 may also be considered a domain name registrant and/or a customer of the domain name registrar 120. The user 100 may use a client device 110, such as, as non-limiting examples, a cell phone, PDA, tablet, laptop computer, or desktop computer to access a website (such as a registrar website 130 of a domain name registrar 120) via a computer network, such as the Internet.

The process for registering a domain name with .com, .net, .org, and some other TLDs allows a user 100 to use an ICANN-accredited domain name registrar 120 to register their domain name. The domain name registrar 120 includes a domain name registration function 134 to register one or more domain names to a plurality of users 100. If a user 100, for example John Doe, wishes to register the domain name "mycompany.com," John Doe may initially determine whether the desired domain name is available by contacting a domain name registrar 120.

A domain name registrar 120 may operate a registrar website 130 having a plurality of webpages accessible over the Internet by users/customers 100 operating client devices 110. The website is hosted or operated from one or more servers. The server may be, as a non-limiting example, one or more Dell PowerEdge(s) @ rack server(s) although other types of servers or combinations of one or more servers may be used.

Figure 2:
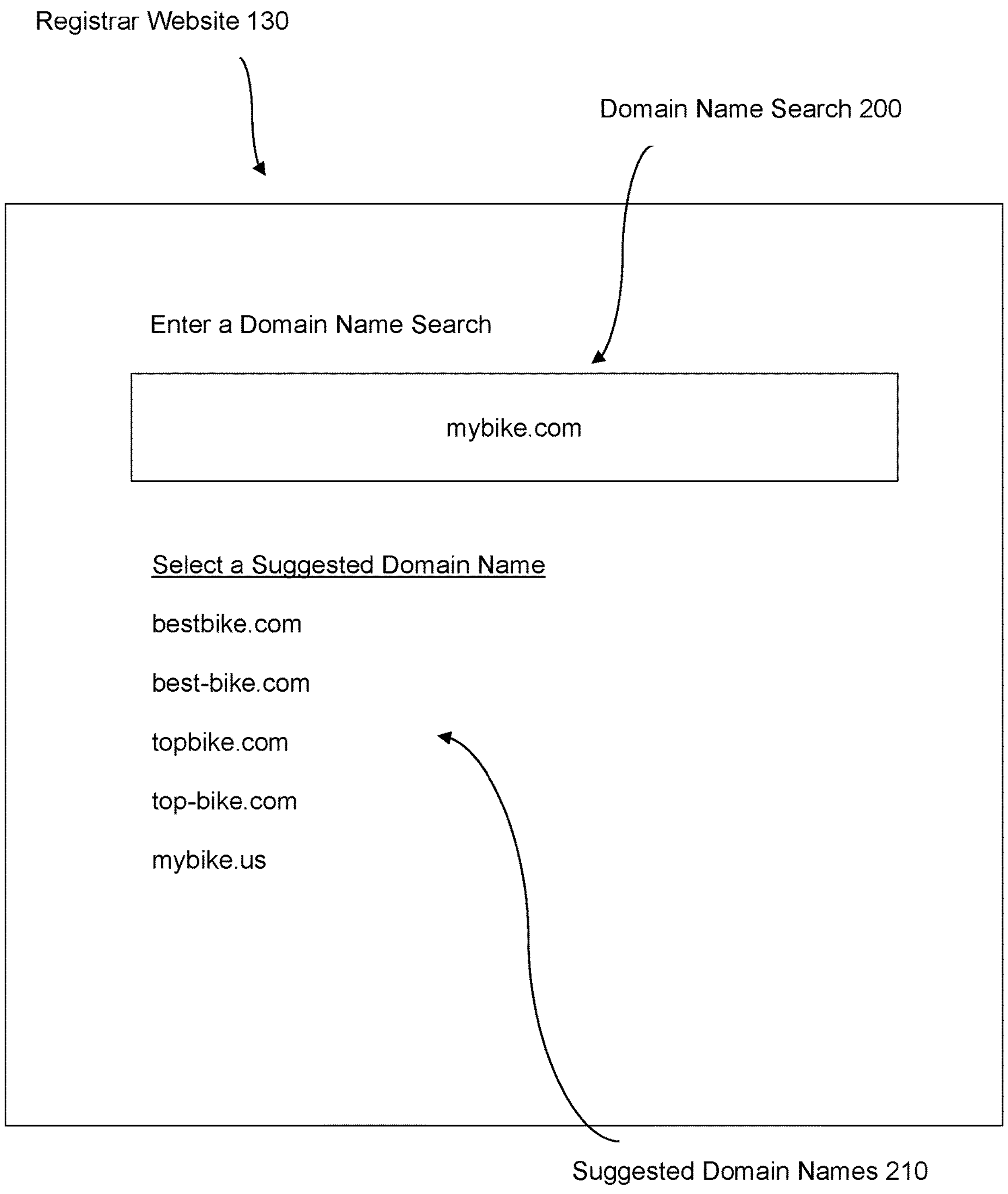
FIG. 2 is an illustration of a simple example registrar website. In this simple example website there is a field for entering a domain name search and a place where a plurality of suggested domain names may be listed. The user may select one or more of the suggested domain names, thereby entering the selected suggested domain names into an electronic shopping cart. The user may complete the purchase/registration of one or more of the selected suggested domain names in the electronic shopping cart so that the selected suggested domain names are registered to the user.

Referring to FIG. 2, the webpages may have one or more data entry fields as well as one or more display fields. The data entry fields allow a user 100 to enter data into the registrar website 130 from a client device 110.

The user 100 may contact the domain name registrar 120 using the registrar website 130 of the domain name registrar 120 and type a domain name search, such as a desired domain name, into a field on the registrar website 130 created for this purpose. As an example, the user 100 may type "mycompany.com" into the data entry field.

Upon receiving the request from the user 100, the domain name registrar 120 may ascertain whether "mycompany-.com" has already been registered by, as a non-limiting example, checking with a Registry associated with the TLD for the domain name. The results of the search may be displayed on the website to thereby notify the potential user 100 (user 100) of the availability of the domain name.

If the domain name is available, the user 100 may proceed with the registration process. If the domain name is not available for registration, the user 100 may keep selecting alternative domain names until an available domain name is found. In preferred embodiments, the domain name registrar 120 may use the entered domain name as a domain name search 200 and use the domain name search 200 to create other available similar suggested domain names the user 100 may wish to register.

A user 100 may create a registrar customer account 170 with the domain name registrar 120. As the domain name registrar 120 will have a plurality of customers, i.e., users 100, the domain name registrar 120 may manage a plurality of registrar customer accounts 170. Each registrar customer account 170 may be protected by, as non-limiting examples, requiring a user name and a password and/or a secondary authentication method (biometric or possession of a cell phone having a known cell phone number) from the user 100. The registrar customer account 170 will hold the information of all of the domain names registered to the user 100 with the domain name registrar 120 (the user 100 may have domain names with other domain name registrars) and the other products and services the user 100 has with the domain name registrar 120.

As non-limiting examples, a registrar customer account 170 may list one or more domain names registered to the account holder (user 100). The domain name registrar 120 has access to the registrar customer account 170 of the user 100 and thus knows what domain names are used by and registered to the user 100.

The present invention may use a learning algorithm 140 to suggest domain names to a user 100. Learning algorithms may be inspired and loosely patterned after a biological brain and are useful in solving highly complex problems that have a large number of inputs. Learning algorithms may comprise electrical circuits and/or software running on one or more computer hardware servers.

Figure 12:
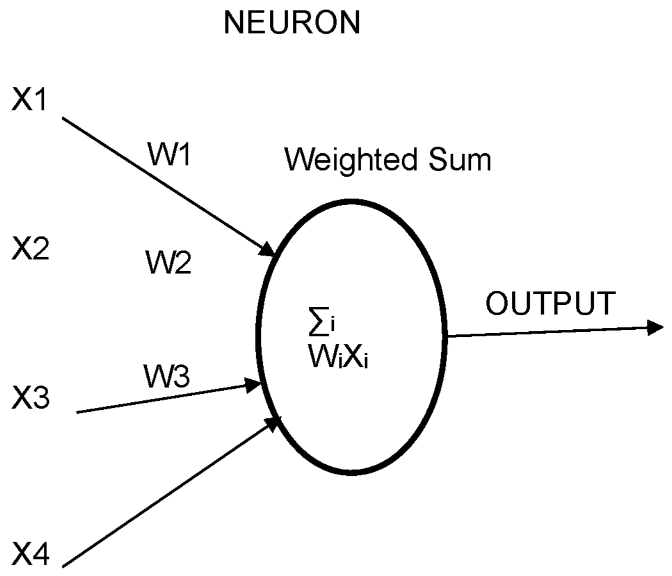
FIG. 12 is a diagram of a neuron, one type of node or artificial neuron that may be used to create a learning algorithm.
Figure 13:
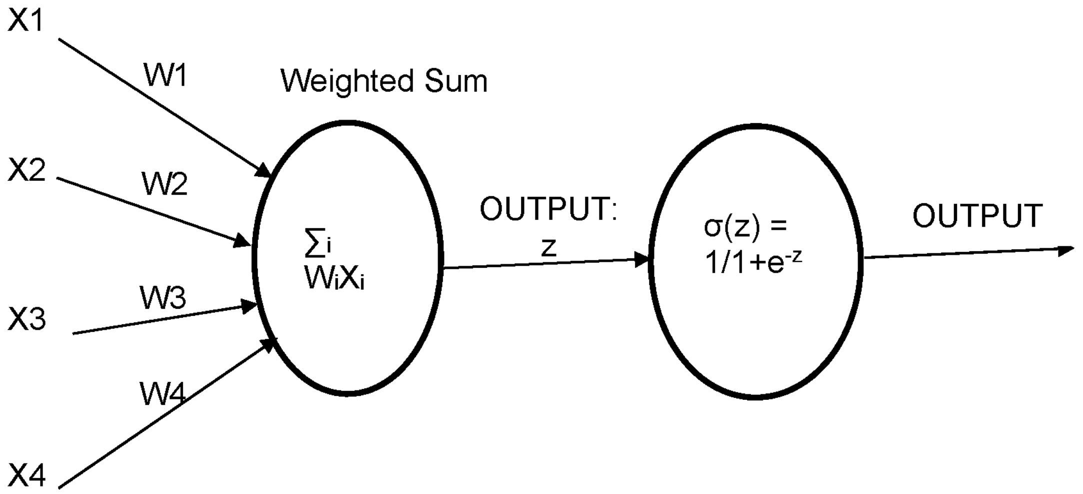
FIG. 13 is a diagram of a sigmoid neuron, another type of node or artificial neuron, that may be used to create a learning algorithm.

Learning algorithms may comprise a plurality of layers, with each layer comprising a plurality of nodes, i.e., artificial neurons, that may be of any known or later developed type of artificial neuron. As non-limiting examples, the nodes may be neurons (as illustrated in FIG. 12), sigmoid neurons (as illustrated in FIG. 13), rectified linear unit (ReLU) neurons, Long Short Term Memory (LSTM) neurons and/or Gated Recurrent Units (GRU) neurons. Any combination of these types of nodes or artificial neurons, or later developed nodes or artificial neurons, may be used in the learning algorithm 140. Regardless of the specific types of nodes used in the learning algorithm 140, all nodes must run on electrical circuits and/or software running on one or more computer hardware servers.

Figure 10:
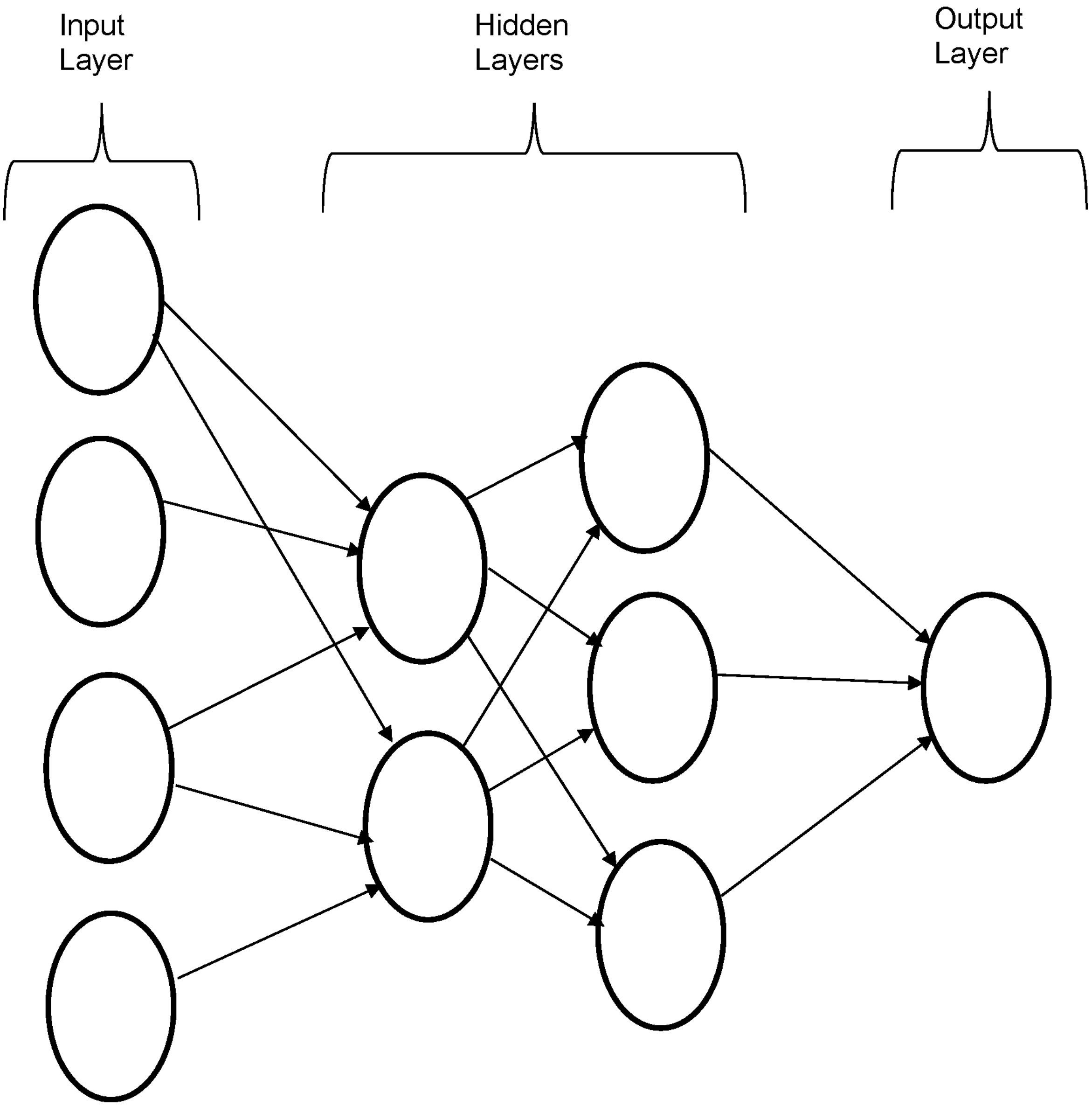
FIG. 10 is a diagram of a possible arrangement of nodes, i.e., artificial neurons, for a learning algorithm that comprises an Artificial Neural Network (ANN), a Recurrent Neural Network (RNN) and/or a Neural Network (NN). The learning algorithm may comprise an input layer having one or more nodes, one or more hidden layers, with each hidden layer comprising one or more nodes and an output layer having one or more nodes. As illustrated, information is allowed to flow forward (left to right in the diagram), but is preferably prevented from flowing backwards through the nodes.

As illustrated in FIG. 10, learning algorithms 140 may comprise an input layer having one or more inputs, one or more hidden layers with each hidden layer having one or more nodes (also referred to as artificial neurons) and an output layer having one or more outputs. Each input in the input layer may forward a single output or number to one or more nodes in the first hidden layer.

Figure 11:
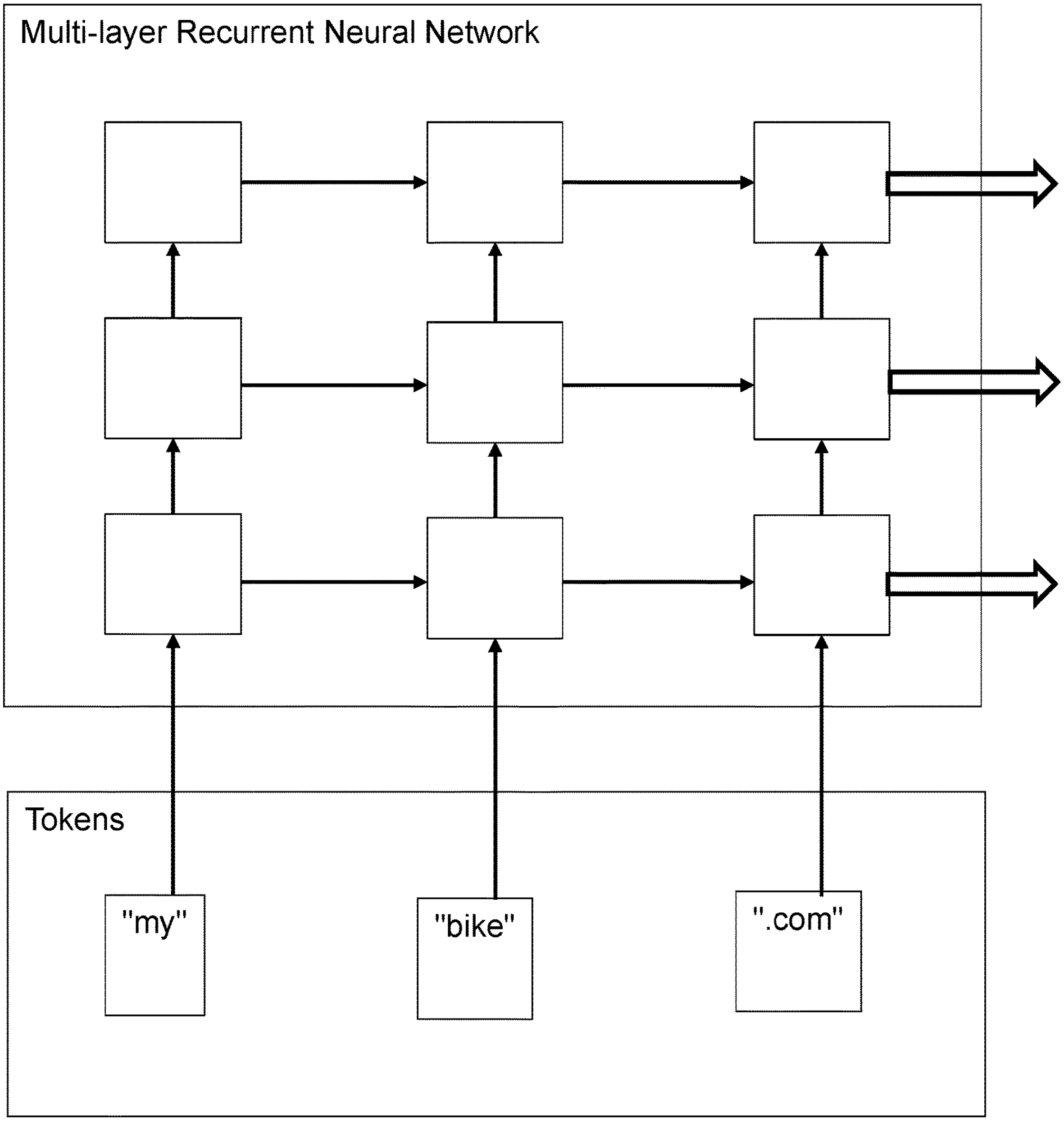
FIG. 11 is a diagram of a learning algorithm that is a multi-layered RNN that illustrates how different character strings (encoded into a high dimension meaning vector) may be feed into this multi-layered RNN.

As illustrated in the example of FIG. 11, each rectangular box inside of the multi-layer recurrent neural network (RNN) may be an RNN unit at a specific timestep. Each unit may contain several neurons and performs a mix of linear and non-linear operations. Each unit may propagate its output to its upper-layer unit at the next timestep. The units at the last timestep may output the high dimension meaning vector that encodes the meaning of the input domain name.

Inputs to a recurrent neural network (RNN) may be applied directly to any of the hidden layers, thereby skipping over earlier hidden layers. Each node may apply a different weight to each of its inputs (initially the weight is a random real number, but the weight will likely be adjusted during the training process). The output of each node may be based on a summation of the weighted inputs and a bias for the node. This calculation may be referred to as the activation function and it converts a node's weighted inputs and bias to an output of the node.

Depending on the type of node, i.e., artificial neuron being used, the outputs are typically between −1 and 1, inclusive, 0 and 1, inclusive or greater than or equal to 0. The output for each node may be an input to one or more nodes in the next or later layer as specifically shown in FIGS. 10 and 11.

Outputs are generally not allowed to be connected to an input of the same layer or earlier layers as learning algorithms 140 typically work better using a forward feed of information.

Each layer in the hidden layers may have one or more nodes that receive inputs from a previous hidden layer and apply their outputs to a subsequent layer. The last layer in the hidden layers may be connected to the inputs to the one or more nodes of the output layer.

Creating a Training Database

A method for creating a training database 180, which may be used to train the learning algorithm 140 to suggest domain names, will now be discussed. The learning algorithm 140 may be any type of desired artificial intelligence. As non-limiting examples, the learning algorithm 140 may use machine learning or be an artificial neural network (ANN).

A user 100 may login to a registrar customer account 170 using any desired method. In other embodiments, the user 100 does not have to login to a registrar customer account 170 to collect activity data from the user 100.

Figure 14:
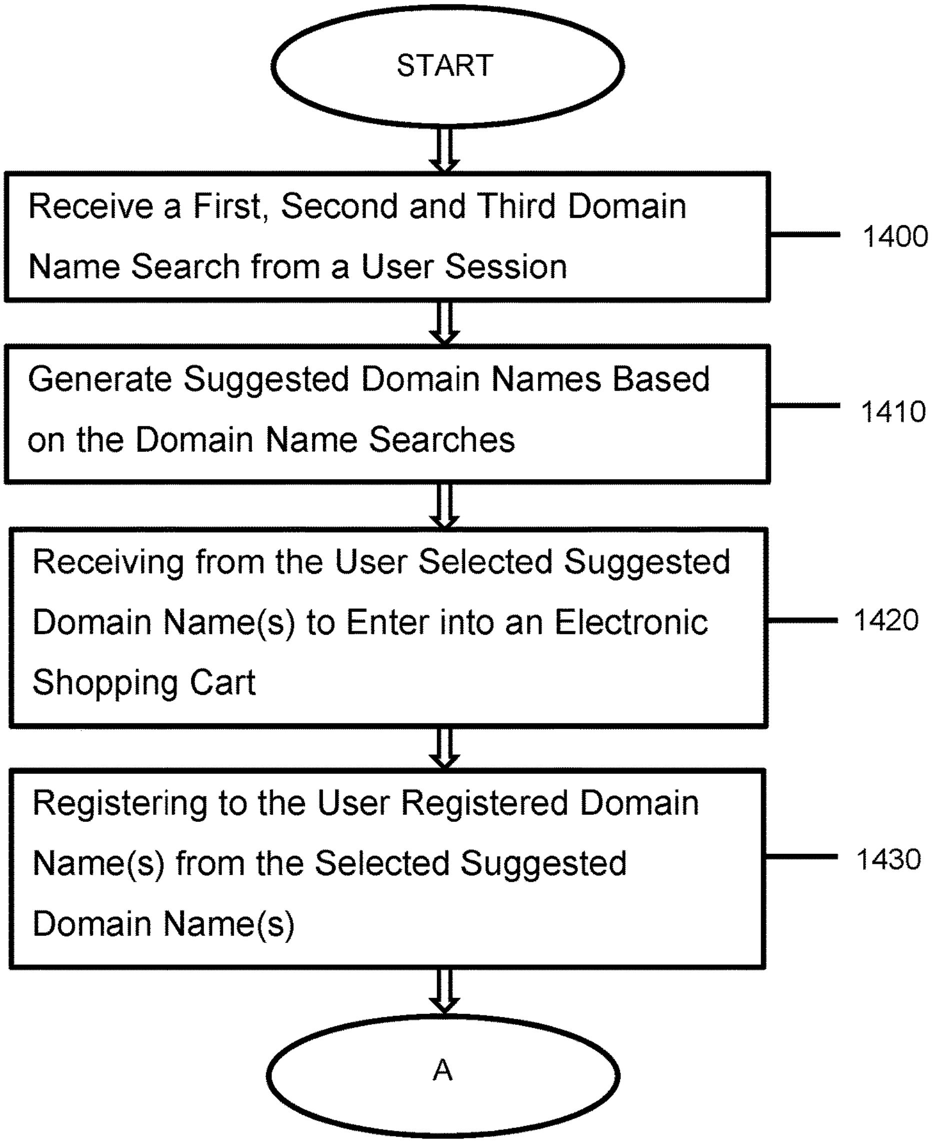
FIGS. 14 and 15 are flowcharts illustrating a process of creating a training data that may be used to train a learning algorithm to suggest domain names.
Figure 15:
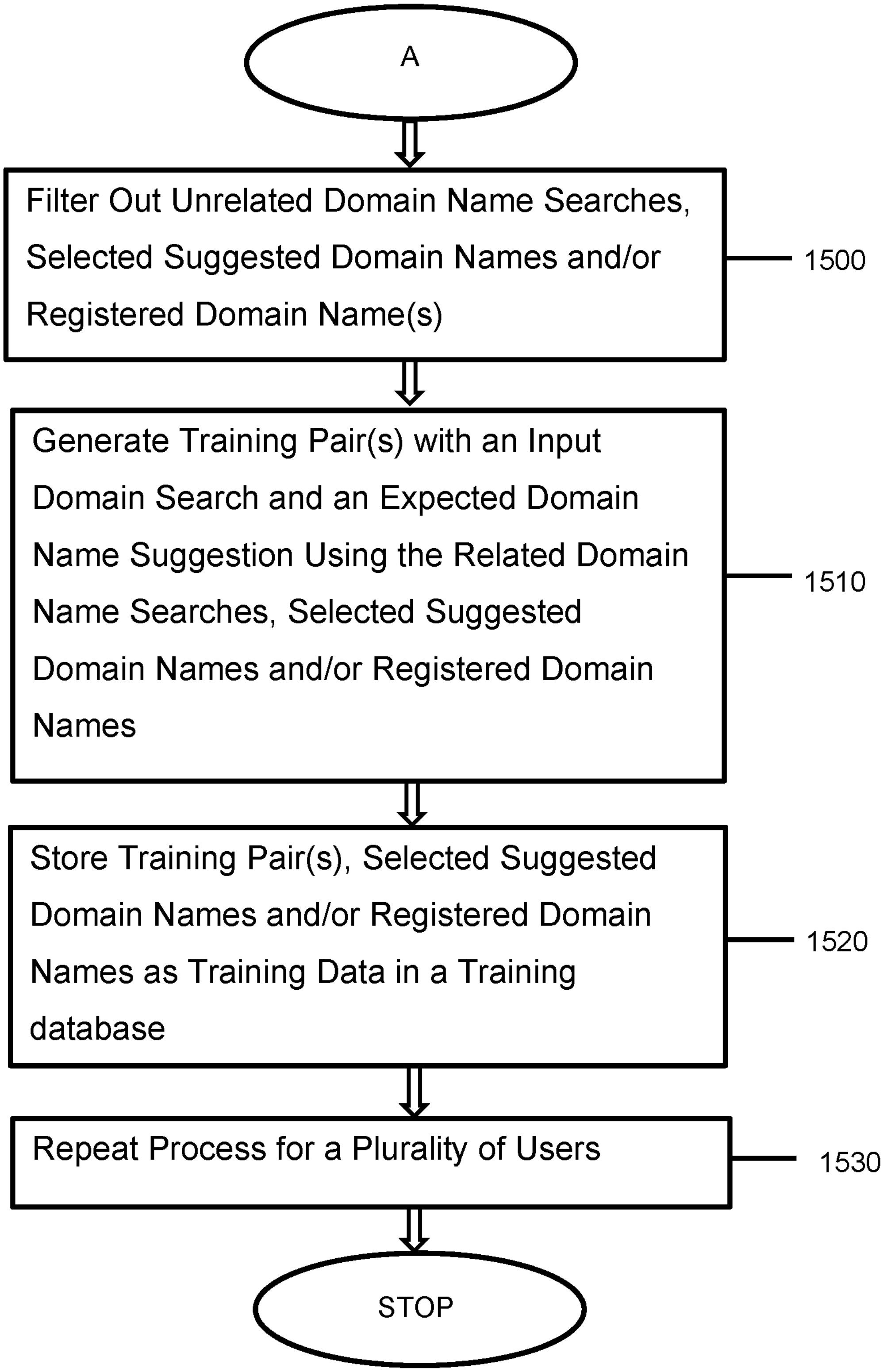

Referring to the flowcharts in FIGS. 14 and 15, a domain name registrar 120 may receive a domain name search 200 from the user 100, i.e., a customer or a domain name registrant. (Step 1400) As an example, the domain name search 200 illustrated in FIG. 2 is "mybike.com." Thus, in the illustrated example, the domain name search 200 was in the format of a domain name, but the domain name search 200 may comprise one or more words, symbols, abbreviations or other character strings.

The domain name registrar 120 may generate one or more suggested domain names 210 based on the entered domain name search 200 using any desired method. (Step 1410) The domain name registrar 120 may transmit the suggested domain names 210 as part of a webpage to the client device 110 of the user 100. The user 100 may see the suggested domain names 210 on the webpage of the registrar website 130. A list of suggested domain names 210 that may be selected by the user 100 are also on the webpage illustrated in FIG. 2. In the illustrated example, the suggested domain names 210 of "bestbike.com," "best-bike.com," "topbike-.com," "top-bike.com" and "mybike.us" are illustrated as suggested domain names 210 for the user 100 to select.

The user 100 may select none, one or a plurality of the suggested domain names 210 using any desired means, such as by the user 100 clicking (selecting) on one or more of the suggested domain names 210 with a mouse. Selected suggested domain names 210 may be added to an electronic shopping cart 132. (Step 1420)

The user 100 might not purchase/register any of the selected suggested domain names in the electronic shopping cart 132 or the user 100 might purchase/register one or more of the selected suggested domain names in the electronic shopping cart 132. (Step 1430)

The process of the user 100: 1) entering domain name searches 200 into the registrar website 130; 2) being presented with suggested domain names 210; 3) having the option to select one or more of the suggested domain names 210 to add to an electronic shopping cart 132 and 4) having the option to purchase/register one or more of the selected suggested domain names in the electronic shopping cart 132 may be repeated by the user 100 any number of times as desired by the user 100. The domain name registrar 120 may log and store the domain name search(es) 200, the selected suggested domain name(s) and the purchased/registered domain name(s) to the user 100.

In a preferred embodiment, the domain name search(es) 200, the selected suggested domain name(s) and/or the purchased/registered domain name(s) are all collected from a single continuous login session of the user 100. This helps to insure that the collected data from the user 100 are related to each other and to the same search. Activities of different users or activities of the same user 100, but at different times, are preferably not mixed together as this might corrupt the training data 340, i.e., combine inputs with unrelated expected outputs for the learning algorithm.

In another embodiment, the domain name search(es) 200, selected suggested domain name(s) and/or registered domain name(s) are all evaluated to verify they are related to a common search to prevent mixing inputs with unrelated expected outputs, for example, from the user's professional or commercial activities with the user's personal or family activities. This may be performed, as an example, by tokenizing the domain name search(es) 200, selected suggested domain name(s) and/or registered domain name(s) and only counted as related if they share at least one token or a synonym of the one token. This filters out unrelated data and prevents the training data 340 from being corrupted by mixing or associating unrelated inputs and expected outputs with each other. (Step 1500)

Referring to FIG. 3, the training data 340 may be generated and stored in a training database 180 in predefined allowable formats. (Step 1510) While the training data 340 may be stored in any type of data structure, the training data 340 in FIG. 3 is stored in a table. In preferred embodiments, the table has a column for an input domain search 300 (input) and a column for an expected domain name suggest (expected output).

The table may also optionally have a column for related searches 320 and/or a column for related registered domain names 330. The columns in the table may be in any order. Each row contains data for one cycle of training the learning algorithm 140. Thus, in FIG. 3, four cycles of training data are illustrated. In practice, it would be desirable to have at least data for thousands of cycles and preferably as many training cycles as possible. The rows may be in any order or may be in a random order in the table.

Data entered by the user 100 representing domain name search(es) 200, selected suggested domain name(s) and/or registered domain name(s) entered in a single continuous login session of the user 100 may be stored in the training database 180 in the predefined allowable formats. (Step 1520)

As a non-limiting example of an allowable format, a first domain name search may be an input domain search 300 (stored under the "input domain search" column) and a second domain name search may be an expected domain name suggestion 310 (stored under the "expected domain name suggestion" column). As another non-limiting example of an allowable format, the second domain name search may be an input domain search 300 (stored under the "input domain search" column) and a third domain name search may be an expected domain name suggestion 310 (stored under the "expected domain name suggestion" column). As another non-limiting example of an allowable format, the first domain name search 200 may be an input domain search 300 (stored under the "input domain search" column) and a selected suggested domain name may be an expected domain name suggestion 310 (stored under the "expected domain name suggestion" column). As another non-limiting example of an allowable format, the first domain name search 200 may be an input domain search 300 (stored under the "input domain search" column) and a registered domain name may be an expected domain name suggestion 310 (stored under the "expected domain name suggestion" column).

These formats are desirable as the input domain search 300 (entered earlier in time by the user 100) leads to the expected domain name suggestion 310 (produced later in time). Thus, the learning algorithm 140 will take as input the input domain search 300 and be trained to produce the expected domain name suggestion 310. The training data 340 is preferably stored in the training database 180 in one or more of these allowable formats.

Data entered by the user 100 representing domain name search(es) 200, selected suggested domain name(s) and/or registered domain name(s) should not be stored in the training database 180 and/or used to train the learning algorithm in predefined unallowable formats. As a non-limiting example of an unallowable format, a second domain name search should not be stored as an input domain search 300 with a first domain name search being stored as an expected domain name suggestion 310.

As another non-limiting example of an unallowable format, a third domain name search should not be stored as an input domain search 300 with the second domain name search being stored as an expected domain name suggestion 310. Again, this would incorrectly store a later activity as an input with an earlier activity as an expected output.

As another non-limiting example of an unallowable format, a selected suggested domain name should not be stored as an input domain search 300 with a domain name search stored as an expected domain name suggestion 310.

As another non-limiting example of an unallowable format, a registered domain name should not be stored as an input domain search 300 with a domain name search being stored as an expected domain name suggestion 310.

These formats are not desirable as the input domain search 300 (produced later in time by the user) leads to the expected domain name suggestion 310 (entered earlier in time). This is in reverse order from the desired direction of the learning algorithm.

Figure 4:
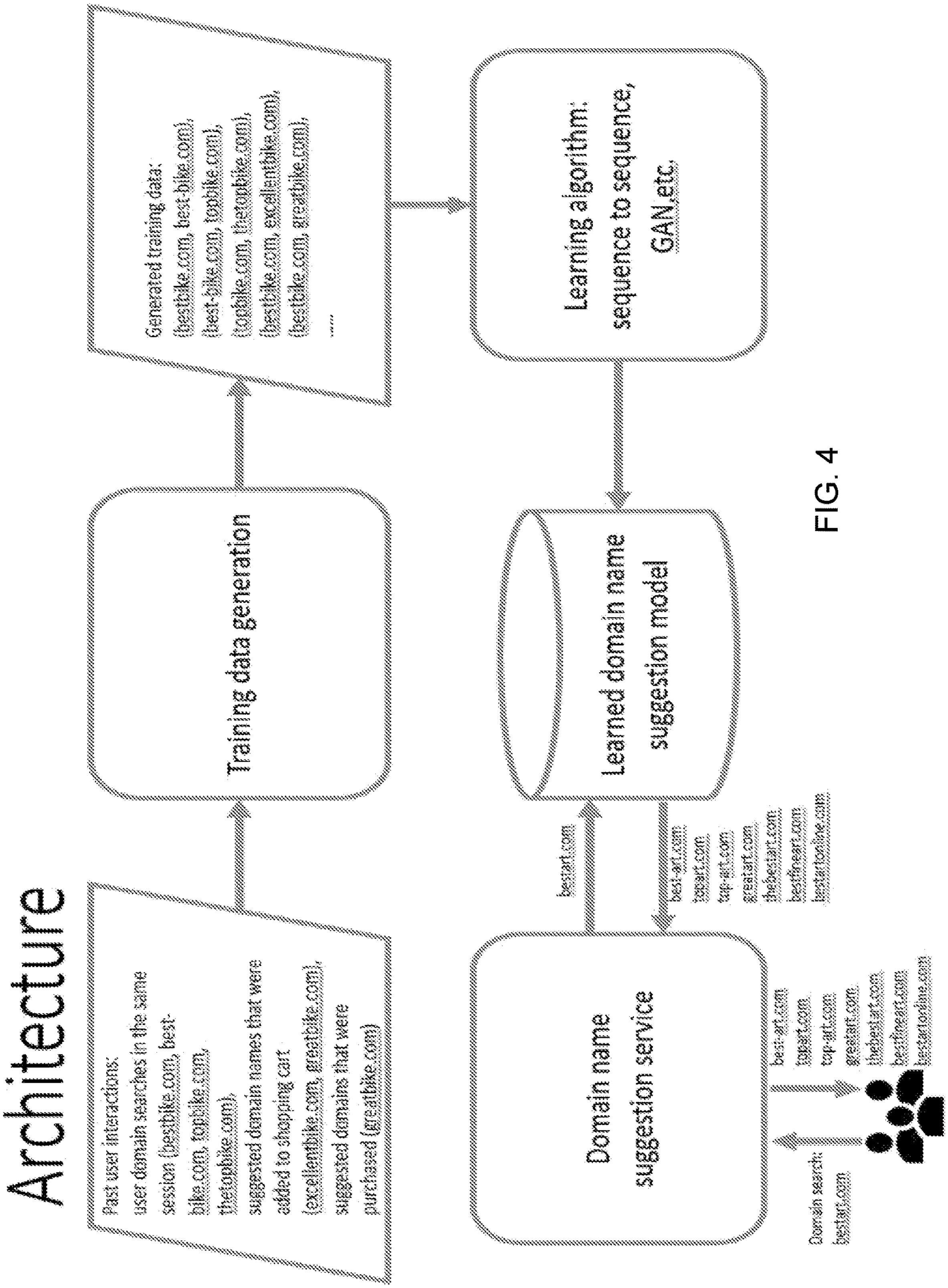
FIG. 4 is an illustration of the Architecture showing the overall process of collecting user activity data, creating and storing training data, training a learning algorithm to suggest a domain name and a user using the learning algorithm to receive a suggested domain name.

Referring to FIG. 4, the learning algorithm 140 may transform data from different sources into a common format: pairs of input domain searches 300 and expected domain name suggestions 310. As a non-limiting example for the searches (bestbike.com, best-bike.com, topbike.com, thetopbike.com), the learning algorithm 140 may generate pairs such as: (bestbike.com, best-bike.com), (best-bike.com, topbike.com), (topbike.com, thetopbike.com), (best-bike.com, topbike.com), (bestbike.com, thetopbike.com).

As another non-limiting example, for the search bestbike.com, (excellentbike.com, greatbike.com) may have been added to an electronic shopping cart 132. Based on these selected generated domain name, the learning algorithm 140 may generate pairs such as: (bestbike.com, excellentbike.com) and (bestbike.com, greatbike.com).

As another non-limiting example, for the search bestbike.com, if greatbike.com was purchased, the learning algorithm 140 may generate the pair (bestbike.com, greatbike.com).

The learning algorithm 140 may also filter out pairs where two domains are not relevant to each other to improve the quality of the training data 340, such as: (bestbike.com, sunnyvaleparks.com)

The above process of collecting data may be repeated for a plurality of other users 100 and/or the same user 100 during a different continuous login session. (Step 1530)

Training a Learning Algorithm

Figure 5:
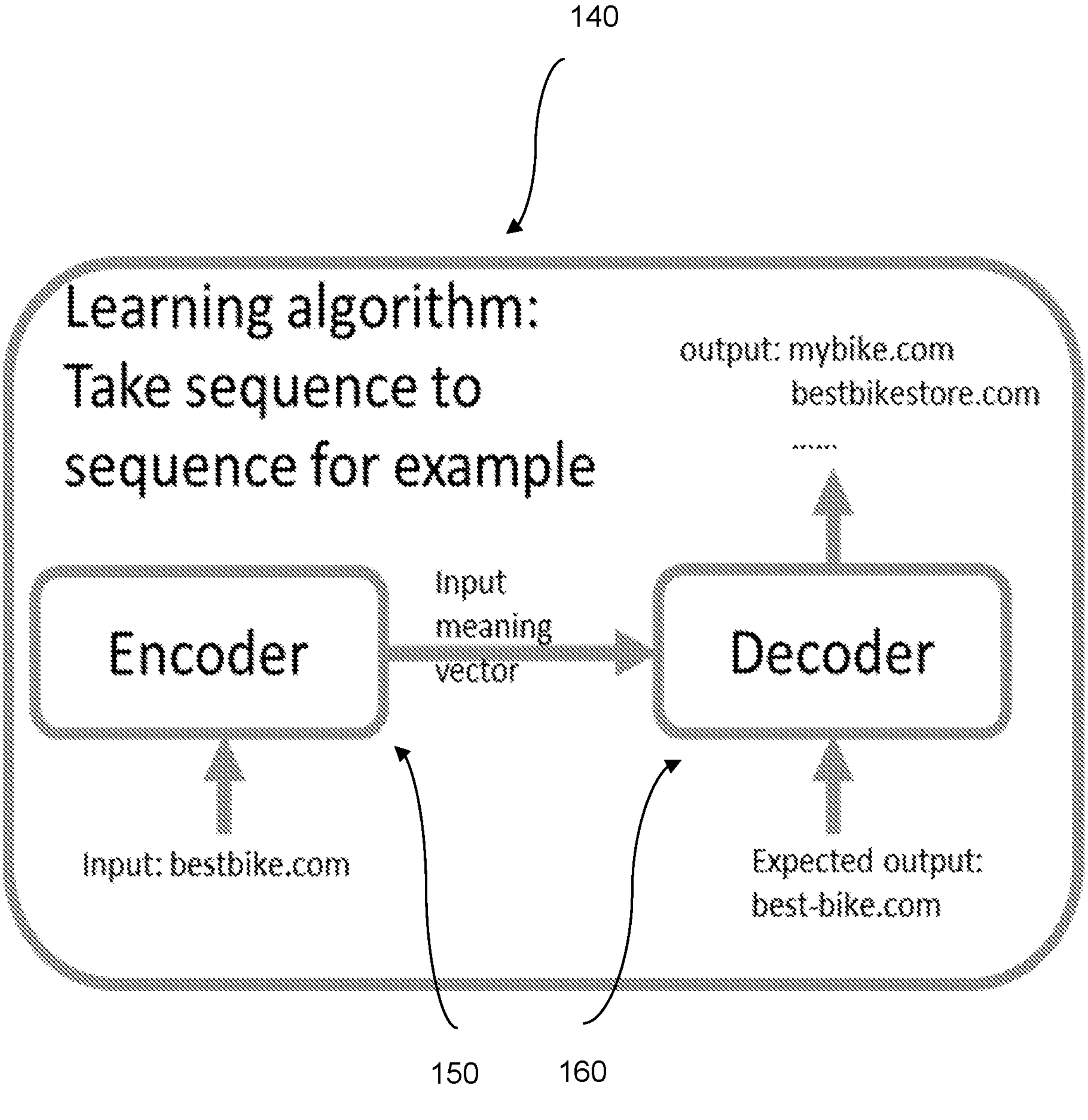
FIG. 5 is an example illustration of a learning algorithm that comprises an encoder and a decoder.

Referring to FIG. 5, the parameters in the learning algorithm 140, including the encoder 150 and decoder 160, may be randomly initialized at the start of the training process. For the training pair (bestbike.com, best-bike.com), the encoder 150 encodes the meaning of the input domain (bestbike.com) into a high dimension meaning vector and passes the high dimension meaning vector to the decoder 160. The decoder 160 may generate a domain name suggestion based on the high dimension meaning vector. Based on the differences between the decoder 160 output and the expected output, the parameters in the encoder 150 and the decoder 160 may be adjusted so that there will be a higher chance to generate the expected output in a future cycle. All of the pairs in the training data 340 may be fed into the learning algorithm 140 in an iterative manner several times before a domain name suggestion model is generated, i.e., the learning algorithm 140 is fully trained.

Figure 16:
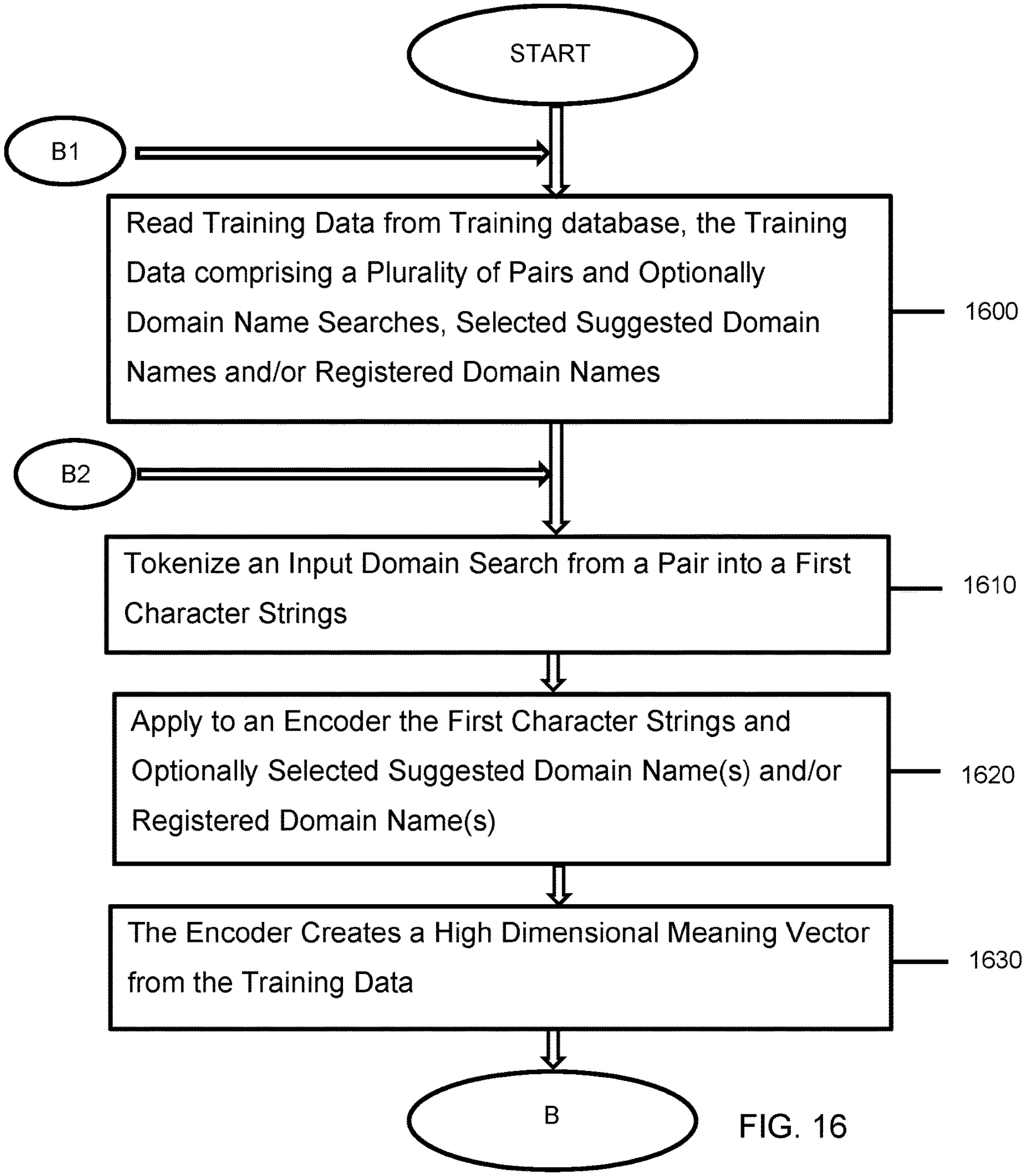
FIGS. 16 and 17 are flowcharts illustrating a process of training a learning algorithm using training data.
Figure 17:
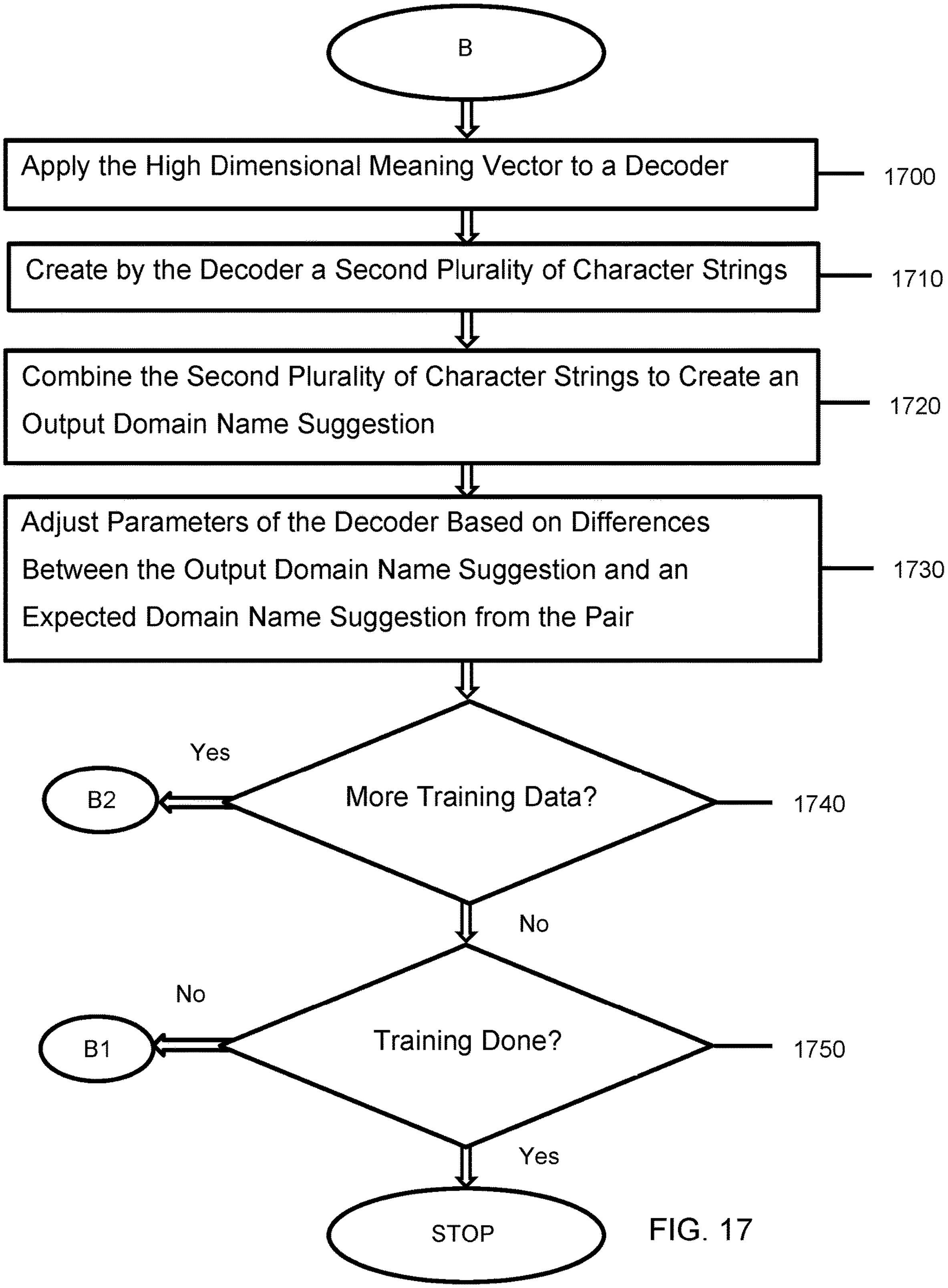
Figure 18:
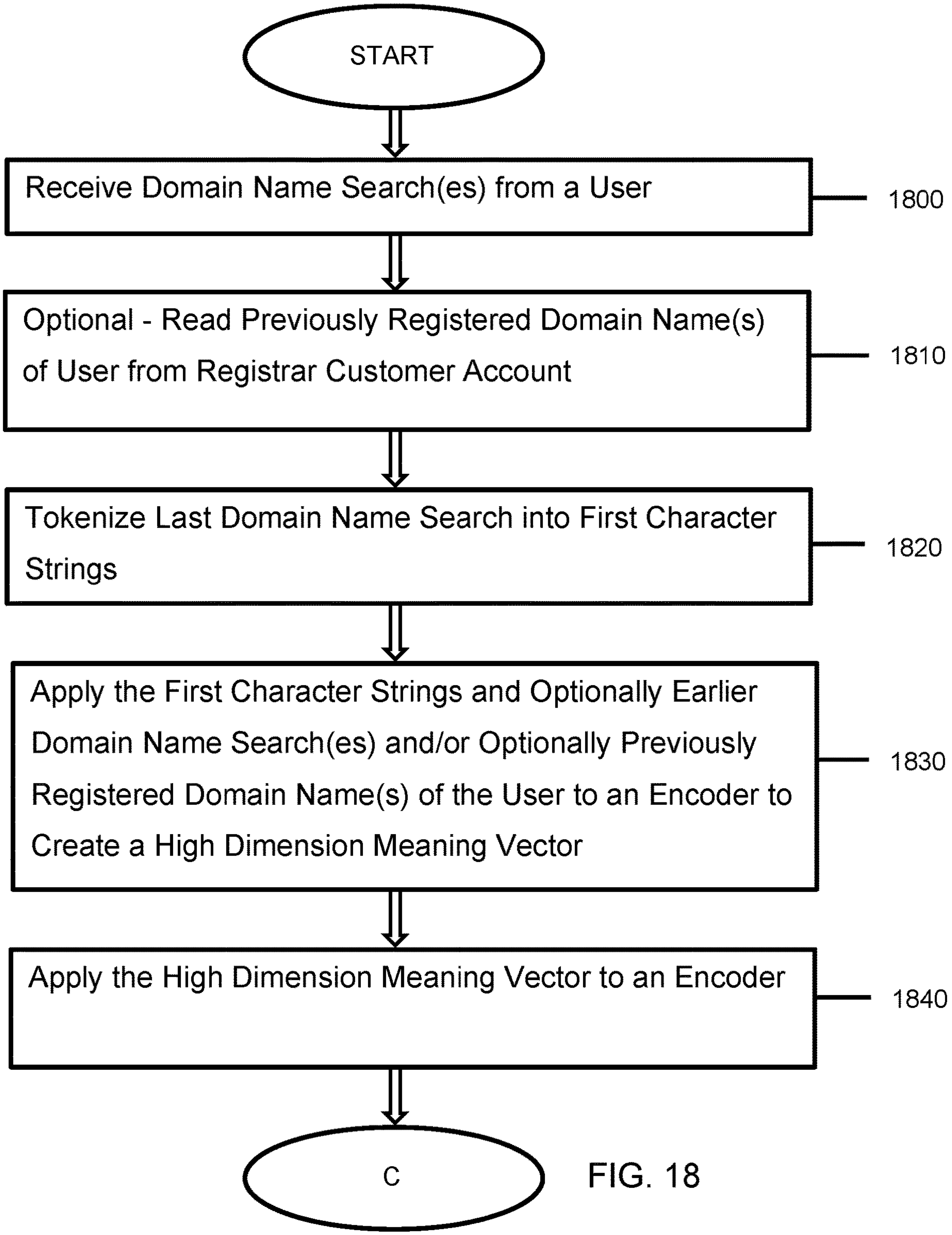
FIGS. 18 and 19 are flowcharts illustrating a process of using a trained learning algorithm to suggest a domain name to a user for registration.
Figure 19:
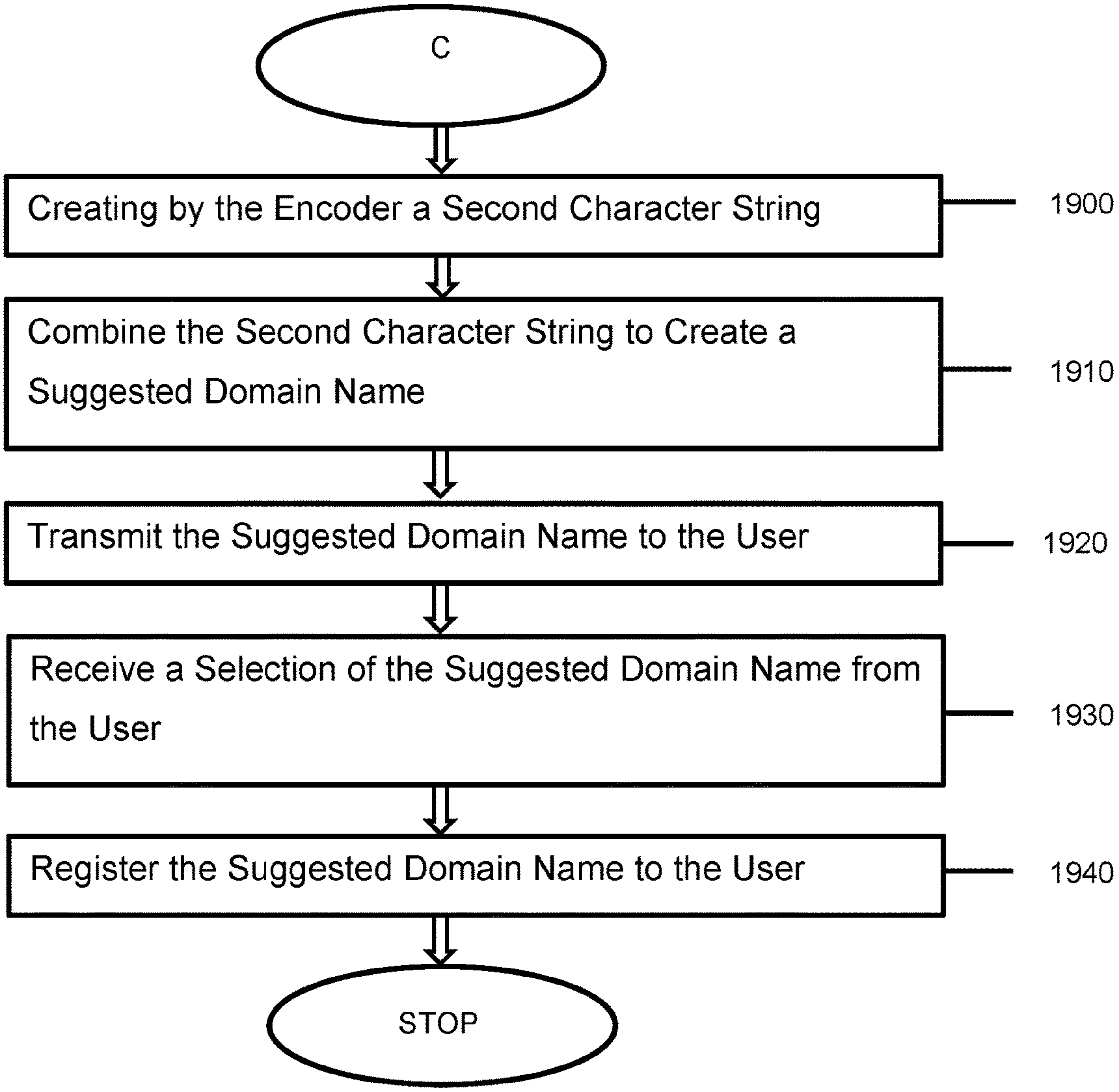

FIGS. 16 and 17 are flowcharts for a method of training a learning algorithm 140 using the training data 340 stored in the training database 180. A domain name registrar 120 may read the training data 340 from the training database 180. (Step 1600) The training data 340 preferably comprises an input and an expected output. The input to the learning algorithm 140 may be an input domain name search 200 (preferably tokenized to words) and optionally other domain name search(es), selected suggested domain name(s) and/or registered domain name(s) of a user 100. The expected output may be an expected domain name suggestion 310.

Figure 8:
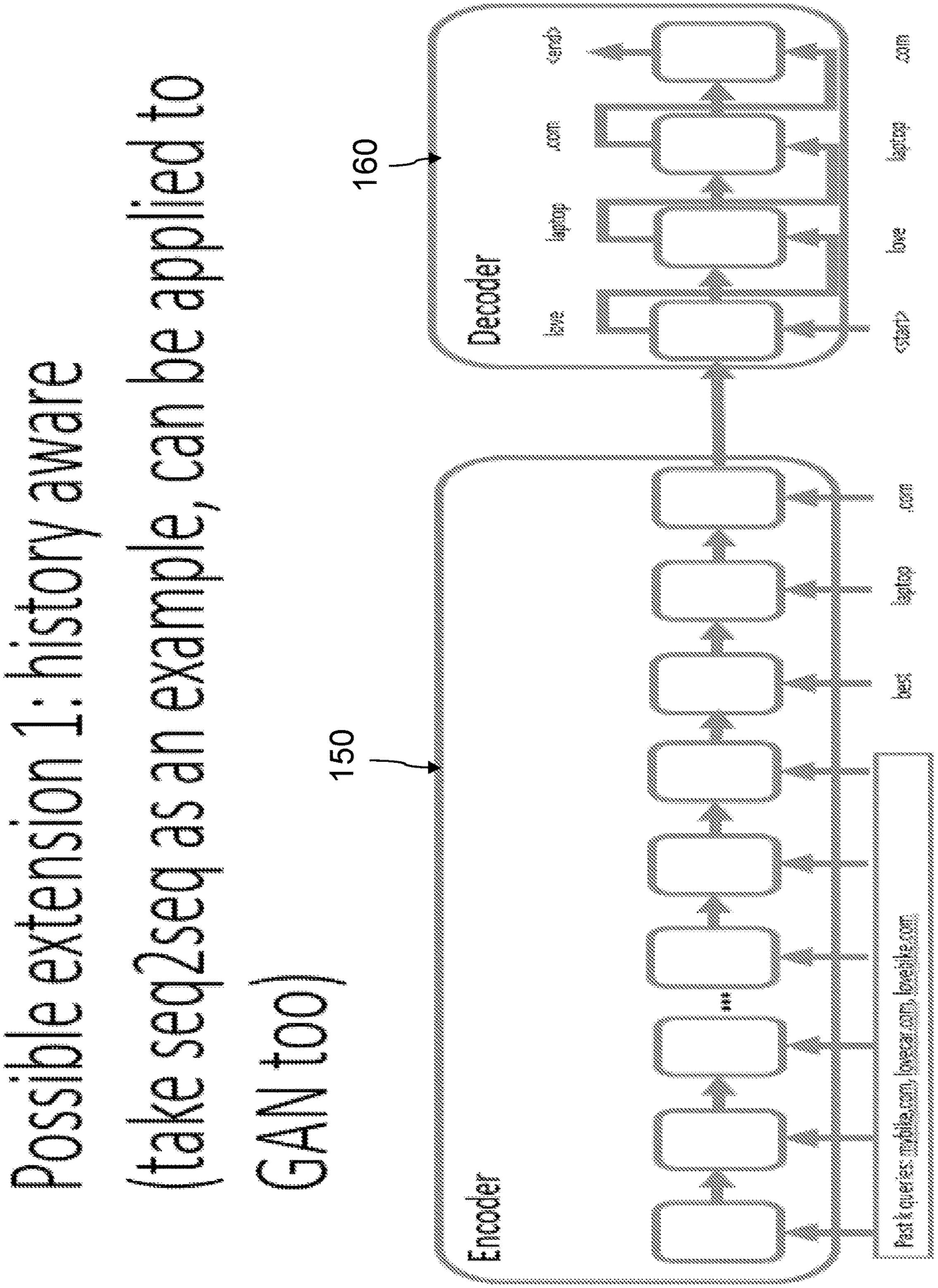
FIG. 8 is an example illustration of a learning algorithm that is history aware in that the encoder of the learning algorithm receives as inputs earlier related domain name searches of the user.
Figure 9:
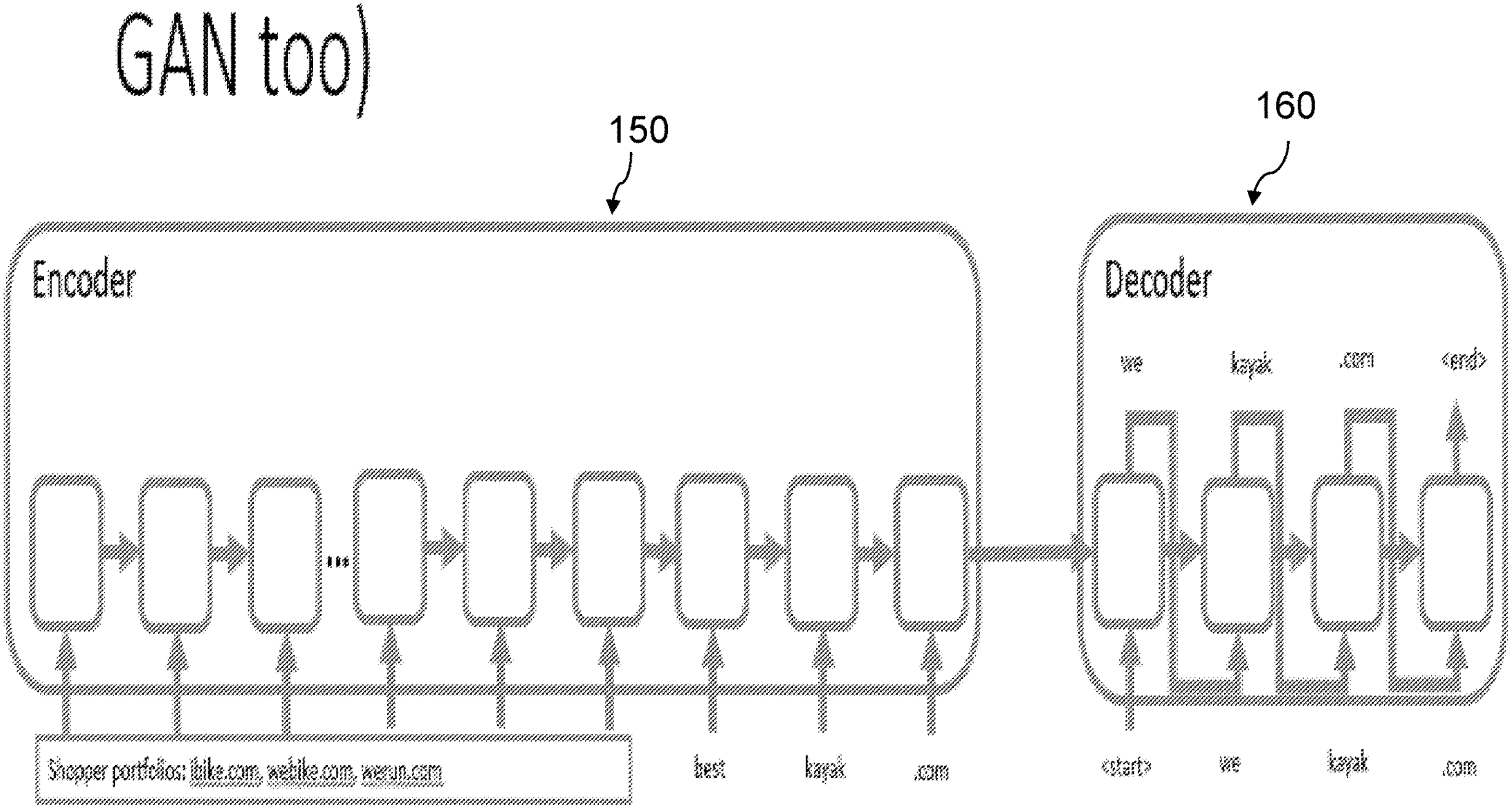
FIG. 9 is an example illustration of a learning algorithm that is portfolio-driven in that the encoder of the learning algorithm receives as inputs related registered domain names of the user

FIG. 8 is an example illustration of a learning algorithm 140 that is history aware in that the encoder 150 of the learning algorithm 140 receives as inputs earlier related domain name searches of the user 100. FIG. 9 is an example illustration of a learning algorithm 140 that is portfolio-driven in that the encoder 150 of the learning algorithm 140 receives as inputs related registered domain names 330 of the user 100. It should also be understood that the learning algorithm 140 may be both history aware and portfolio-driven so that the encoder 150 of the learning algorithm 140 receives earlier related domain name searches 320 and related registered domain names 330 of the user 100.

The training involves applying the input to an encoder 150 of the learning algorithm 140. The example training data 340 in FIG. 3 illustrates inputs and expected outputs for four cycles.

Figure 6:
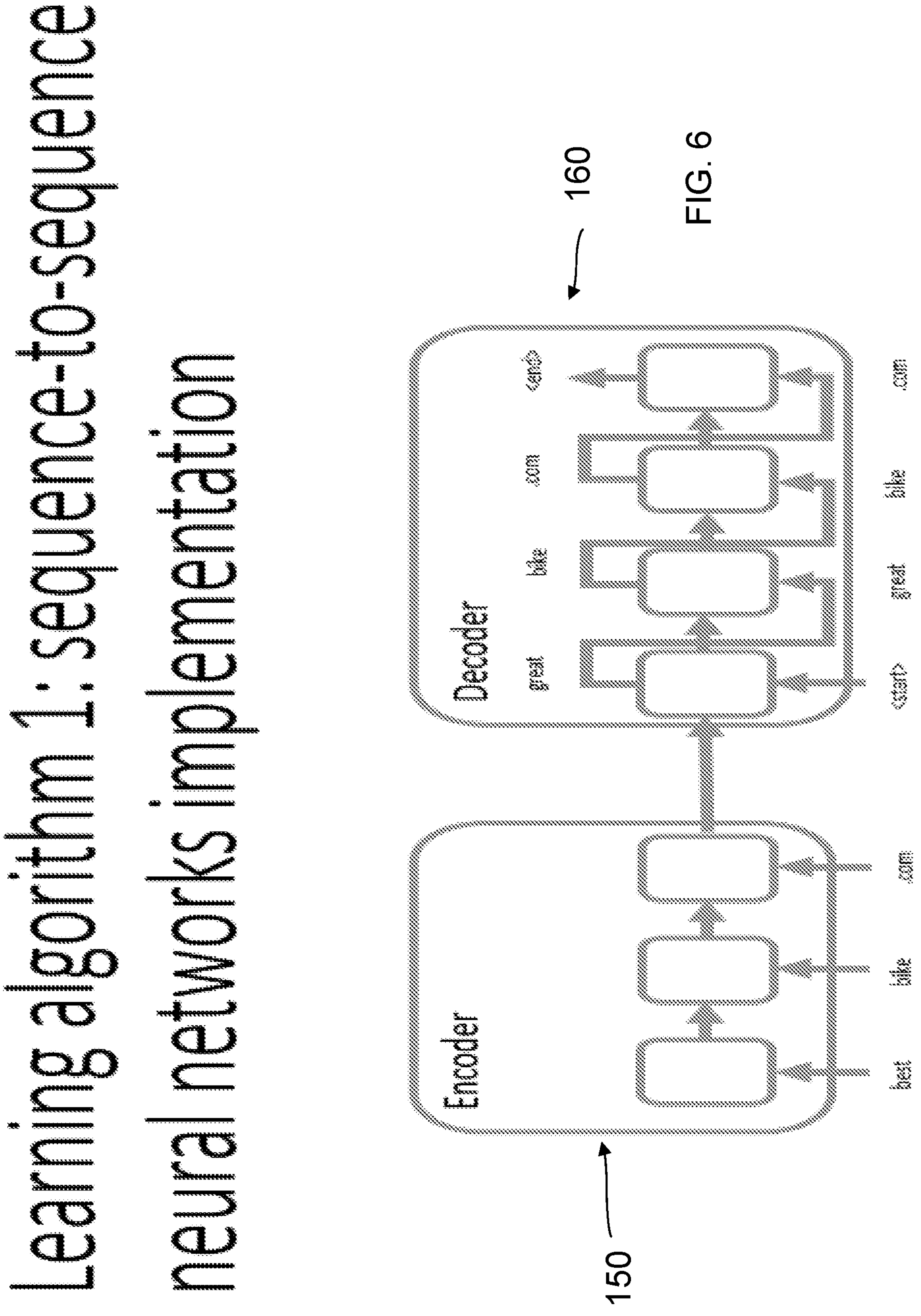
FIG. 6 is an example illustration of a learning algorithm with a sequence-to-sequence neural network implementation.

As a first example cycle, the input to an encoder 150 may be the input domain search 300 "mybike.com" (preferably tokenized to "my," "bike" and ".com" (Step 1610)), and optionally the related searches 320 "best-bike.com" and "topbike.com" and/or the related registered domain names 330 "hotbikes.com" and "great-bikes.com." (Step 1620) The encoder 150 creates a high dimension meaning vector for this input, which is applied to a decoder 160 of the learning algorithm 140. (Step 1630) FIG. 6 illustrates how each token in the input domain search 300 may be applied to a different cell in the encoder 150.

Any desired method of tokenizing the input domain search 300 into one or more tokens may be used. As a nonlimiting example, the learning algorithm 140 may parse each input domain search 300, from left to right, character by character and compare the parsed characters to one or more electronic dictionaries looking for words. For the purposes of the specification, each token may comprise a word, place, name, abbreviation, phrase, number, dash and/or a string of characters (default if the word does not fit any other category).

In preferred embodiments, many different language dictionaries (preferably at least the languages most commonly used on the Internet), location dictionaries, name dictionaries, abbreviation dictionaries and/or phrase dictionaries may be used in identifying tokens/words. The parsing process may be repeated until one or more tokens are found for each input domain search 300. In some cases, an input domain search 300 might comprise a string of characters that do not match any entries in any dictionary. In such a case, that string of unrecognized characters may still be considered a token.

In some cases, an input domain search 300 may be able to be broken up into two or more sets of tokens. As an example, if the input domain search 300 is "carrot.com," the input domain search 300 may be broken into a first set of tokens "car" and "rot" and a second set of the tokens "carrot." In this situation, the learning algorithm 140 may determine how frequently the words "car" and "rot" appear (and perhaps how frequently they appear in close proximity) and how frequently the word "carrot" appears in some text corpus selected for this purpose.

The encoder 150 may use, as a non-limiting example, 40 dimensions to create a high dimension meaning vector for the input. Thus, the input might have a high dimension meaning vector of [0.5, 0.1, 0.9, 0.2, 0.4, 0.4, 0.3, 0.2, 0.7, 0.1, 0.2, 0, 1, 0.6, 0.6, 0.8, 0.1, 0.8, 0.2, 0.1, 0.8, 0.7, 0.4, 0.3, 0.6, 0.9, 0.9, 0.1, 0.2, 0.1, 0.6, 0.5, 0.3, 0.5, 0.4, 0.2, 0.6, 0.9, 0.7, 0.7] as determined by the encoder 150. This high dimension meaning vector maps the input to a specified point in high dimensional space.

While each dimension may be assigned any number, each of the 40 dimensions are preferably assigned a value between −1 and 1, inclusive or between 0 and 1, inclusive. The range of values may be selected depending on the types of nodes or artificial neurons used by the learning algorithm 140. This allows each dimension to be easily applied to the inputs of the nodes of the learning algorithm 140 without additional weighting or scaling of the values. While a single decimal digit (tenth's place) is displayed for each value in the above example to keep the example simple, additional digits, for example, 0.234956, may be used to increase the accuracy of each value for each dimension and thus of the learning algorithm 140 overall.

The high dimension meaning vector for the input may be applied to a decoder 160. (Step 1700) The high dimension meaning vector may pass through the nodes or artificial neurons of the decoder 160 to produce a second high dimension meaning vector. The second high dimension meaning vector may be decoded to create a plurality of characters strings. (Step 1710) The plurality of character strings may be combined to create an output domain name suggestion. (Steps 1720)

The output domain name suggestion from the decoder 160 of the learning algorithm 140 may be compared with the expected domain name suggestion 310 as stored in the training data 340. In the current example, the expected domain name suggestion 310 from the training data 340 in FIG. 3 is "bestbike.com."

Using any desired technique, such as, as non-limiting examples, gradient descent and/or back propagation, the parameters of the encoder 150 of the learning algorithm 140 may be adjusted so that the input is more likely to produce the expected output in future cycles.

As a second example cycle, the input to the encoder 150 may be the input domain search 300 "new-york-pizza.com" (preferably tokenized to "new," "-," "york," "-," "pizza" and ".com" (Step 1610)), and optionally the related searches 320 "italian-food.ny" and/or the related registered domain names 330 "best-ny-pizza.us." (Step 1620) The encoder 150 creates a high dimension meaning vector for this input, which is applied to a decoder 160 of the learning algorithm 140. (Step 1630) The expected domain name suggestion 310 for this cycle, as shown in the training data 340, is "pizza.ny."

As a third example cycle, the input to the encoder 150 may be the input domain search 300 "smith-family.com" (preferably tokenized to "smith," "-," "family," and ".com" (Step 1610)), and optionally no related searches 320 and/or the related registered domain names 330 "smith-vacation.us." (Step 1620) The encoder 150 creates a high dimension meaning vector for this input, which is applied to a decoder 160 of the learning algorithm 140. (Step 1630) The expected domain name suggestion 310 for this cycle, as shown in the training data 340, is "smithfamily.com."

As a fourth example cycle, the input to the encoder 150 may be the input domain search 300 "dogbreeders.us" (preferably tokenized to "dog," "breeders," and ".us" (Step 1610)), and optionally no related searches 320 and/or no related registered domain names 330. (Step 1620) The encoder 150 creates a high dimension meaning vector for this input, which is applied to a decoder 160 of the learning algorithm 140. (Step 1630) The expected domain name suggestion 310 for this cycle, as shown in the training data 340, is "canine.com."

Additional training data 340 is desirable as it allows additional cycles to be run on the learning algorithm 140, thereby improving the training of the learning algorithm 140. (Step 1740)

Additional epochs, i.e., full-cycles of using all (or some given portion) of the training data 340, may be performed until the learning algorithm 140 has been trained to a desired level. (Step 1750) If parts of the training data 340 are not used for training, these unused parts of the training data 340 may be applied to the learning algorithm 140 to check the progress of the training of the learning algorithm 140 to determine if the learning algorithm 140 has been trained to the desired level.

Using a Learning Algorithm to Produce a Suggested Domain Name

A domain name registrar may collect activity data regarding the activities of a user 100 on a registrar website 130, such as one or more domain name searches entered by the user 100 (Step 1800), one or more suggested domain names 210 selected and entered into an electronic database by the user 100 and/or one or more registered domain names in a registrar customer account 170 of the user 100 (Step 1810).

The registrar may apply the most recent domain name search 200, preferably tokenized to words or tokens (Step 1820), to an encoder 150 of the learning algorithm 140. In other embodiments, one or more other domain name searches, one or more selected suggested domain names and/or one or more domain names registered to the user 100 are also applied as inputs to the encoder 150 of the learning algorithm 140. (Step 1830) It should be appreciated that the same types of input data used to train the learning algorithm 140 should also be used when using the learning algorithm 140 to produce a suggested domain name, i.e., the training data and actual use data should match formats.

The encoder 150 may create a high dimensional meaning vector from the input and apply the high dimensional meaning vector to a decoder 160 of the learning algorithm 140. (Step 1840) The decoder 160 may convert the high dimensional meaning vector to one or more character strings (Step 1900) which may be combined to create a suggested domain name (Step 1910).

Figure 7:
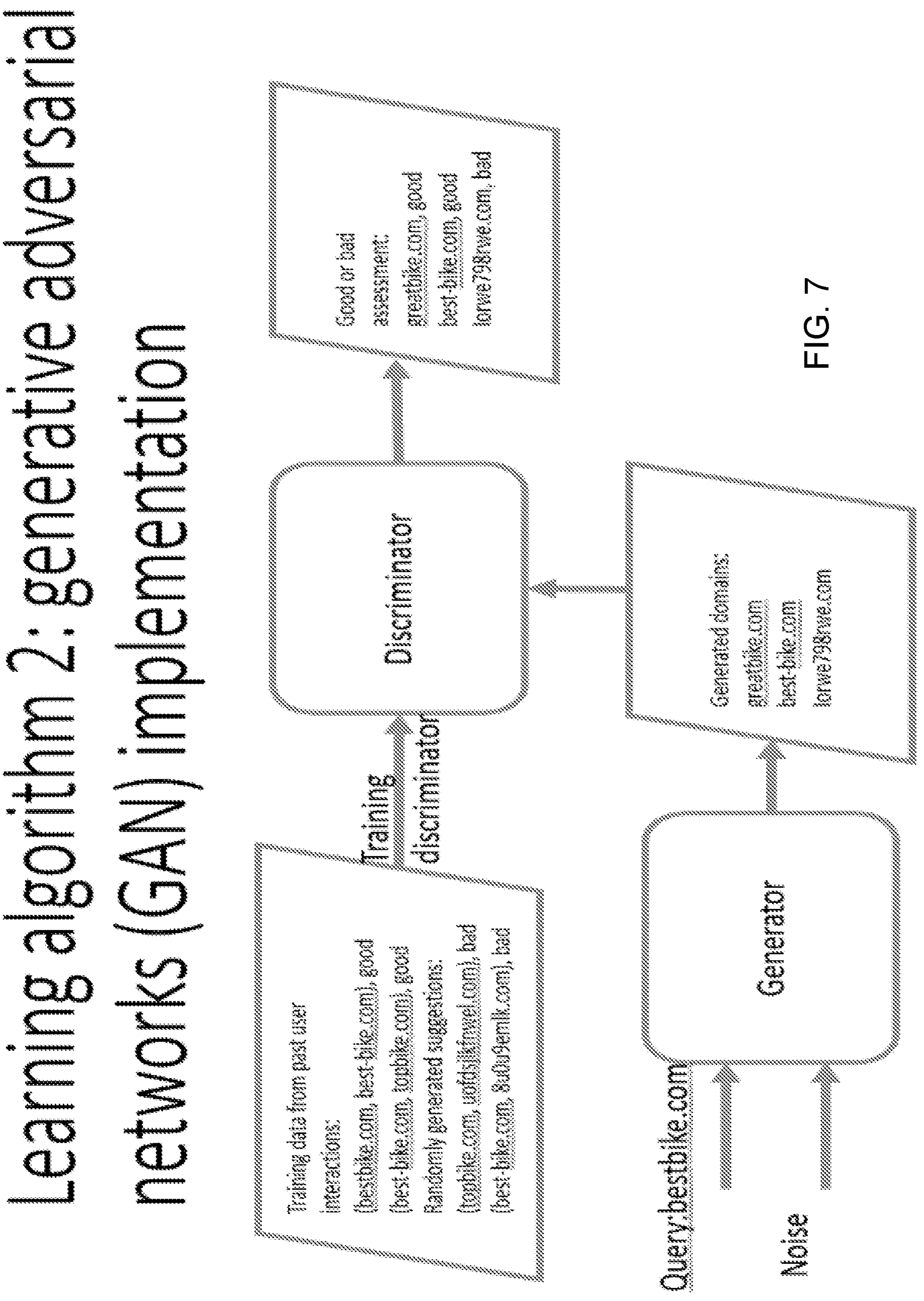
FIG. 7 is an example illustration of a learning algorithm with a generative adversarial network (GAN) implementation.

Referring to FIG. 7, the learning algorithm 140 may also comprise a generative adversarial network (GAN). The GAN may be trained to determine good and bad suggested domain names. Thus, the suggested domain names 210 from the learning algorithm 140 may be applied to the GAN. The suggested domain names 210 that are determined to be good may be transmitted to the user 100 for selection and/or registration while the suggested domain names 210 that are determined to be bad may be screened or filtered out and thus not transmitted to the user 100 for selection and/or registration.

The good suggested domain name may be transmitted to the user 100 (Step 1920) and, if selected by the user 100 for registration (Step 1930), the selected suggested domain name may be registered to the user 100 (Step 1940).

In addition, the domain name registrar 120 may spin the generated suggested domain name to create additional suggested domain names 210 to transmit to the user 100 for possible selection and registration. Any desired method of spinning a suggested domain name may be used.

Using the domain name sunnyvalezoepizza.com as an example, one or more tokens may be dropped to thereby spin the domain names of sunnyvalezoe.com, zoepizza.com, sunnyvalepizza.com, zoe.com and pizza.com.

As another non-limiting example, tokens may be swapped in the example domain name sunnyvalezoepizza.com to thereby produce the domain names of zoesunnyvalepizza.com and sunnyvalepizzazoe.com.

As another non-limiting example, the domain name sunnyvalezoepizza.com may be rewritten to thereby spin the domain names of zoepizzasunnyvale.com, zoespizza.com, thezoepizza.com, zoesunnyvale.com, thesunnyvalepizza.com, pizzazoe.com, sunnyvalepizzeria.com, sunnyvalezoerestaurant.com, zoe-pizza.com, zoepizzeria.com, sunny-vale-zoe.com and sunnyvalezoeonline.com.

As another non-limiting example, the domain name sunnyvalezoepizza.com may be made a plural to spin the domain name sunnyvalezoepizzas.com.

As another non-limiting example, a synonym may replace one of the tokens in the domain name sunnyvalezoepizza.com to spin the domain name sunnyvalezoepizzeria.com.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method for creating training data for a learning algorithm, the method comprising:

logging, by a first entity, in a database, from a first user, a first activity;
  wherein the first activity is one of:
    a first name search,
    a selection of a first selected name from a first plurality of suggested names, or
    a request to register a first registered name from the first plurality of suggested names; and
  wherein the first activity is logged with a first time stamp;
logging, by the first entity, in the database, from the first user, a second activity;
  wherein the second activity is one of:
    a second name search,
    a selection of a second selected name from a second plurality of suggested names, or
    a request to register a second registered name from the second plurality of suggested names;
  wherein the second activity is logged at a second time stamp; and
  wherein the second time stamp is at a time after the first time stamp;
logging, by the first entity, in the database, from the first user, a third activity;
  wherein the third activity is one of:
    a third name search,
    a selection of a third selected name from a third plurality of suggested names, or
    a request to register a third registered name from the third plurality of suggested names;
  wherein the third activity is logged at a third time stamp; and
  wherein the third time stamp is at a time after the second time stamp and after the first time stamp;
generating, by the first entity, the training data, wherein the training data comprises a plurality of pairs;
  wherein the plurality of pairs comprises a first pair, a second pair, and a third pair;
    wherein the first pair comprises:
      the first activity, logged at the first time stamp, as a first input into the learning algorithm, and
      the second activity, logged at the second time stamp, as a first expected output from the learning algorithm;
    wherein the second pair comprises:
      the second activity, logged at the second time stamp, as a second input into the learning algorithm, and
      the third activity, logged at the third time stamp, as a second expected output from the learning algorithm;
    wherein the third pair comprises:
      the first activity, logged at the first time stamp, as a third input into the learning algorithm, and
      the third activity, logged at the third time stamp, as a third expected output from the learning algorithm;
tokenizing a particular activity into a plurality of tokens using a tokenizer, wherein
  the particular activity comprises the first activity, the second activity, and the third activity, and
  the plurality of tokens comprises a first string of characters of the first activity, a second string of characters of the second activity, and a third string of characters of the third activity;
confirming that the first string of characters is a match or is synonym with the second string of characters, and the third string of characters is not a match or synonym with the first string of characters and the second string of characters, wherein the first string of characters, the second string of characters, and the third string of characters are other than a top-level domain;
filtering the third activity from the training data, based on the confirming that the third string of characters is not the match or the synonym with the first string of characters and the second string of characters;

storing, by the first entity, based on the confirming and the filtering, the training data in a training database, the training data comprising a plurality of meaning vectors as input data;

training, by the first entity, the learning algorithm to obtain a trained learning algorithm based on the training data stored within the training database;

iteratively repeating the training of the learning algorithm to determine whether the trained learning algorithm meets a predetermined level of training, wherein the training of the learning algorithm is iteratively repeated based on a likelihood to produce a subsequent expected output, the subsequent expected output comprising a fourth plurality of suggested names, the learning algorithm comprises a Generative Adversarial Network (GAN), the GAN is trained to determine a relevancy of a suggested name of the fourth plurality of suggested names; and the suggested name is filtered out from the fourth plurality of suggested names, based on the determined relevancy, to form a fifth plurality of suggested names;

generating, by the trained learning algorithm meeting the predetermined level of training, the fifth plurality of suggested names by applying an encoder-decoder neural network architecture, wherein an encoder of the encoder-decoder neural network architecture encodes an input activity as a high-dimensional vector, and a decoder of the encoder-decoder neural network architecture generates the fifth plurality of suggested names as output character strings;

adding, by the first entity, the fifth plurality of suggested names to an electronic cart; and registering, by the first entity, at least one domain name of the fifth plurality of suggested names within the electronic cart.

2. The method of claim 1, wherein the training data does not include a pair, among the plurality of pairs, that comprises the second activity as an input into the learning algorithm, and the first activity as an expected output from the learning algorithm.

3. The method of claim 1, wherein the training data does not include a pair, among the plurality of pairs, that comprises the third activity as an input into the learning algorithm, and the first activity as an expected output from the learning algorithm.

4. The method of claim 1, wherein the training data does not include a pair, among the plurality of pairs, that comprises the third activity as an input into the learning algorithm, and the second activity as an expected output from the learning algorithm.

5. The method of claim 1, wherein the first name search comprises a first domain name search, the second name search comprises a second domain name search, and the third name search comprises a third domain name search.

6. A method for creating training data for a learning algorithm, the method comprising:

logging, by a first entity, in a database, from a first user, a first activity;

wherein the first activity is one of:

a first domain name search, a selection of a first selected domain name from a first plurality of suggested domain names, or a request to register a first registered domain name from the first plurality of suggested domain names; and wherein the first activity is logged with a first time stamp;

logging, by the first entity, in the database, from the first user, a second activity;

wherein the second activity is one of:

a second domain name search, a selection of a second selected domain name from a second plurality of suggested domain names, or a request to register a second registered domain name from the second plurality of suggested domain names;

wherein the second activity is logged at a second time stamp; and wherein the second time stamp is at a time after the first time stamp;

logging, by the first entity, in the database, from the first user, a third activity;

wherein the third activity is one of:

a third domain name search, a selection of a third selected domain name from a third plurality of suggested domain names, or a request to register a third registered domain name from the third plurality of suggested domain names;

wherein the third activity is logged at a third time stamp; and wherein the third time stamp is at a time after the second time stamp and after the first time stamp;

generating, by the first entity, the training data, wherein the training data comprises a plurality of pairs;

wherein the plurality of pairs comprises a first pair, a second pair, and a third pair;

wherein the first pair comprises:

the first activity, logged at the first time stamp, as a first input into the learning algorithm, and the second activity, logged at the second time stamp, as a first expected output from the learning algorithm;

wherein the second pair comprises:

the second activity, logged at the second time stamp, as a second input into the learning algorithm, and the third activity, logged at the third time stamp, as a second expected output from the learning algorithm;

wherein the third pair comprises:

the first activity, logged at the first time stamp, as a third input into the learning algorithm, and the third activity, logged at the third time stamp, as a third expected output from the learning algorithm;

tokenizing a particular activity into a plurality of tokens using a tokenizer, wherein the particular activity comprises the first activity, the second activity, and the third activity, and the plurality of tokens comprises a first string of characters of the first activity, a second string of characters of the second activity, and a third string of characters of the third activity;

confirming that the first string of characters is a match or is synonym with the second string of characters, and that the third string of characters is not a match or synonym with the first string of characters and the second string of characters, wherein the first string of characters, the second string of characters, and the third string of characters are other than a top-level domain;

filtering the third activity from the training data, based on the confirming that the third string of characters is not the match or the synonym with the first string of characters and the second string of characters;

storing, by the first entity, based on the confirming and the filtering, the training data, in a training database, the training data comprising a plurality of meaning vectors as input data;

training, by the first entity, the learning algorithm, to obtain a trained learning algorithm based on the training data stored within the training database;

evaluating, by the first entity, the trained learning algorithm by applying a validation set comprising user activities to determine that a predetermined accuracy threshold associated with predicting expected outputs for the validation set is met;

iteratively repeating the training of the learning algorithm to determine whether the trained learning algorithm meets a predetermined level of training, wherein the training of the learning algorithm is iteratively repeated based on a likelihood to produce a subsequent expected output, and wherein the subsequent expected output comprising a fourth plurality of suggested domain names;

generating, by the trained learning algorithm meeting the predetermined accuracy threshold, the fourth plurality of suggested domain names by applying an encoder-decoder neural network architecture, wherein an encoder of the encoder-decoder neural network architecture encodes an input activity as a high-dimensional vector, and a decoder of the encoder-decoder neural network architecture generates the fourth plurality of suggested domain names as output character strings;

adding, by the first entity, the fourth plurality of suggested domain names to an electronic shopping cart; and registering, by the first entity, at least one domain name of the fourth plurality of suggested domain names within the electronic shopping cart.

7. The method of claim 6, wherein the training data does not include a pair, among the plurality of pairs, that comprises the second activity as an input into the learning algorithm, and the first activity as an expected output from the learning algorithm.

8. The method of claim 6, wherein the training data does not include a pair, among the plurality of pairs, that comprises the third activity as an input into the learning algorithm, and the first activity as an expected output from the learning algorithm.

9. The method of claim 6, wherein the training data does not include a pair, among the plurality of pairs, that comprises the third activity as an input into the learning algorithm, and the second activity as an expected output from the learning algorithm.

10. A method for creating training data for a learning algorithm, the method comprising:

logging, by a first entity, in a database, from a first user, a first activity;

wherein the first activity is one of:

a first domain name search, a selection of a first selected domain name from a first plurality of suggested domain names, or a request to register a first registered domain name from the first plurality of suggested domain names; and wherein the first activity is logged with a first time stamp;

logging, by the first entity, in the database, from the first user, a second activity;

wherein the second activity is one of:

a second domain name search, a selection of a second selected domain name from a second plurality of suggested domain names, or a request to register a second registered domain name from the second plurality of suggested domain names;

wherein the second activity is logged at a second time stamp; and wherein the second time stamp is at a time after the first time stamp;

logging, by the first entity, in the database, from the first user, a third activity;

wherein the third activity is one of:

a third domain name search, a selection of a third selected domain name from a third plurality of suggested domain names, or a request to register a third registered domain name from the third plurality of suggested domain names;

wherein the third activity is logged at a third time stamp; and wherein the third time stamp is at a time after the second time stamp and after the first time stamp;

generating, by the first entity, the training data, wherein the training data comprises a plurality of pairs;

wherein the plurality of pairs comprises a first pair, a second pair, and a third pair;

wherein the first pair comprises:

the first activity, logged at the first time stamp, as a first input into the learning algorithm, and the second activity, logged at the second time stamp, as a first expected output from the learning algorithm;

wherein the second pair comprises:

the second activity, logged at the second time stamp, as a second input into the learning algorithm, and the third activity, logged at the third time stamp, as a second expected output from the learning algorithm; and wherein the third pair comprises:

the first activity, logged at the first time stamp, as a third input into the learning algorithm, and the third activity, logged at the third time stamp, as a third expected output from the learning algorithm;

tokenizing a particular activity into a plurality of tokens using a tokenizer, wherein the particular activity comprises the first activity, the second activity, and the third activity, and the plurality of tokens comprises a first string of characters of the first activity, a second string of characters of the second activity, and a third string of characters of the third activity;

confirming that the first string of characters is a match or is synonym with the second string of characters, and that the third string of characters is not a match or synonym with the first string of characters and the second string of characters, wherein the first string of characters, the second string of characters, and the third string of characters are other than a top-level domain;

filtering the third activity from the training data, based on the confirming that the third string of characters is not the match or the synonym with the first string of characters and the second string of characters;

storing, by the first entity, based on the confirming and the filtering, the training data in a training database, the training data comprising a plurality of meaning vectors as input data;

training, by the first entity, the learning algorithm to obtain a trained learning algorithm based on the training data stored within the training database;

logging, by the first entity, in the database, from a second user, a fourth domain name search;

wherein the fourth domain name search is logged with a fourth time stamp;

wherein the fourth time stamp is at a time after the first, second, and third time stamps;

utilizing the trained learning algorithm to determine a fourth plurality of suggested domain names, based on the fourth domain name search;

generating, by the trained learning algorithm, the fourth plurality of suggested domain names by applying an encoder-decoder neural network architecture, wherein an encoder of the encoder-decoder neural network architecture encodes an input activity as a high-dimensional vector, a decoder of the encoder-decoder neural network architecture generates the fourth plurality of suggested domain names as output character strings, the learning algorithm comprises a Generative Adversarial Network (GAN), the GAN is trained to determine a relevancy of a suggested name of the fourth plurality of suggested domain names, and the suggested name is filtered out from the fourth plurality of suggested domain names, based on the determined relevancy, to form a fifth plurality of suggested domain names;

adding, by the first entity, the fifth plurality of suggested domain names to an electronic shopping cart; and registering, by the first entity, at least one domain name of the fifth plurality of suggested domain names within the electronic shopping cart.

11. The method of claim 10, wherein the first user and the second user are same user.

12. The method of claim 10, wherein the first user and the second user are different users.

13. The method of claim 10, wherein the training data does not include a pair, among the plurality of pairs, that comprises the second activity as an input into the learning algorithm, and the first activity as an expected output from the learning algorithm.

14. The method of claim 10, wherein the training data does not include a pair, among the plurality of pairs, that comprises the third activity as an input into the learning algorithm, and the first activity as an expected output from the learning algorithm.

15. The method of claim 10, wherein the training data does not include a pair, among the plurality of pairs, that comprises the third activity as an input into the learning algorithm, and the second activity as an expected output from the learning algorithm.

16. The method of claim 10, wherein the training data does not include a pair, among the plurality of pairs, that comprises the second activity as an input into the learning algorithm, and the first activity as an expected output from the learning algorithm, the training data does not include a pair, among the plurality of pairs, that comprises the third activity as an input into the learning algorithm, and the first activity as an expected output from the learning algorithm, and the training data does not include a pair, among the plurality of pairs, that comprises the third activity as input into the learning algorithm, and the second activity as an expected output from the learning algorithm.

17. The method of claim 10, wherein the training data further comprises at least one additional pair of the training data including an input and an expected output.

* * * * *